US012630353B2

(12) United States Patent
Stoddart et al.

(10) Patent No.: US 12,630,353 B2
(45) Date of Patent: May 19, 2026

(54) PRESSURIZED VESSEL DISCHARGE MODIFIER

(71) Applicant: BEHR PROCESS CORPORATION, Santa Ana, CA (US)

(72) Inventors: Darren Wade Stoddart, Huntington Beach, CA (US); Marcel Faucher, New Boston, NH (US)

(73) Assignee: Behr Process Corporation, Santa Ana, CA (US)

( * ) Notice: Subject to any disclaimer, the term of this patent is extended or adjusted under 35 U.S.C. 154(b) by 410 days.

(21) Appl. No.: 18/032,087

(22) PCT Filed: Oct. 25, 2021

(86) PCT No.: PCT/US2021/056469
§ 371 (c)(1),
(2) Date: Apr. 14, 2023

(87) PCT Pub. No.: WO2022/093699
PCT Pub. Date: May 5, 2022

(65) Prior Publication Data
US 2023/0391538 A1 Dec. 7, 2023

Related U.S. Application Data

(60) Provisional application No. 63/107,132, filed on Oct. 29, 2020.

(51) Int. Cl.
*B65D 83/20* (2025.01)
*B05B 1/16* (2006.01)
*B65D 83/22* (2025.01)

(52) U.S. Cl.
CPC ............ *B65D 83/20* (2013.01); *B05B 1/1636* (2013.01); *B65D 83/22* (2013.01)

(58) Field of Classification Search
CPC ...... B65D 83/20; B65D 83/22; B65D 83/205; B05B 1/1636
See application file for complete search history.

(56) References Cited

U.S. PATENT DOCUMENTS 2,887,273 A 5/1959 Anderson et al.
2,997,243 A 8/1961 Kolb
(Continued)

FOREIGN PATENT DOCUMENTS

DE 102005055979 A1 10/2006

OTHER PUBLICATIONS

International Search Report corresponding to PCT/US2021/056469, Jan. 27, 2022, 3 pages.
(Continued)

*Primary Examiner* — Frederick C Nicolas
(74) *Attorney, Agent, or Firm* — Reising Ethington P.C.

(57) ABSTRACT

A discharge modifier includes a fitment a manifold supported by the fitment a distributor rotatably carried by the manifold, and an overcap rotatably coupled to the fitment. The fitment includes outer and inner skirts extending inwardly from a base wall, and walls extending outwardly from the base wall. The manifold includes a cylinder, and spray barrels extending radially outwardly with respect to the cylinder between the fitment walls and including passages in fluid communication with an axial passage of the cylinder. The distributor includes an axial conduit, an outlet in fluid communication with an inlet via an axial passage and a center support rotatably carried in the axial passage of the manifold cylinder and including a transverse passage in fluid communication with the distributor axial passage and having an outlet. The overcap includes a skirt extending away from
(Continued)

a base wall, and an outlet in the skirt that circumferentially aligns with one of the barrels in a spray mode of the discharge modifier.

26 Claims, 22 Drawing Sheets

(56) References Cited

U.S. PATENT DOCUMENTS

| | | | | |
|---|---|---|---|---|
| 3,083,872 | A | 4/1963 | Meshberg | |
| 3,180,536 | A | 4/1965 | Meshberg | |
| 3,199,741 | A * | 8/1965 | Lehmann | B65D 83/20 222/394 |
| 3,206,082 | A | 9/1965 | Green | |
| 3,325,054 | A * | 6/1967 | Braun | B65D 83/226 251/95 |
| 3,342,382 | A | 9/1967 | Huling | |
| 3,653,558 | A | 4/1972 | Shay | |
| 3,703,994 | A | 11/1972 | Nigro | |
| 3,711,030 | A | 1/1973 | Jones | |
| 3,795,366 | A | 3/1974 | McGhie et al. | |
| 3,863,816 | A | 2/1975 | Focht | |
| 3,891,128 | A | 6/1975 | Smrt | |
| 4,187,963 | A * | 2/1980 | Mascia | B65D 83/20 222/402.13 |
| 4,257,560 | A | 3/1981 | Diamond | |
| 4,690,312 | A * | 9/1987 | Crapser | B65D 83/303 239/394 |
| 5,027,982 | A * | 7/1991 | Demarest | B65D 83/20 222/402.11 |
| 5,337,926 | A | 8/1994 | Drobish et al. | |
| 5,385,303 | A * | 1/1995 | Gosselin | B65D 83/44 239/394 |
| 5,388,730 | A * | 2/1995 | Abbott | B65D 83/20 222/321.2 |
| 5,411,185 | A | 5/1995 | Drobish | |
| 5,971,230 | A | 10/1999 | Tanaka | |
| 6,000,583 | A | 12/1999 | Stern et al. | |
| 6,006,957 | A * | 12/1999 | Kunesh | B65D 83/206 222/402.13 |
| 6,027,042 | A | 2/2000 | Smith | |
| 7,278,590 | B1 | 10/2007 | Greer, Jr. et al. | |
| 7,731,062 | B2 * | 6/2010 | Groys | B05B 15/40 222/402.1 |
| 8,276,832 | B2 * | 10/2012 | Nelson | B05B 1/1645 239/394 |
| 8,333,304 | B1 | 12/2012 | Haage | |
| 8,840,045 | B2 | 9/2014 | Thurin et al. | |
| 9,187,236 | B2 | 11/2015 | Greer, Jr. et al. | |
| 9,957,100 | B2 * | 5/2018 | Jasper | B05B 1/1636 |
| 11,305,298 | B2 | 4/2022 | Stoddart | |
| 11,794,984 | B2 * | 10/2023 | Cho | B65D 83/206 |
| 11,820,583 | B2 * | 11/2023 | Mather | B05B 1/14 |
| 2011/0017781 | A1 | 1/2011 | Nelson et al. | |
| 2015/0072076 | A1 | 3/2015 | Greer, Jr. et al. | |
| 2016/0325916 | A1 | 11/2016 | Jasper et al. | |
| 2017/0216852 | A1 | 8/2017 | Gopalan et al. | |
| 2022/0194687 | A1 * | 6/2022 | Mather | B65D 83/206 |

OTHER PUBLICATIONS

Written Opinion corresponding to PCT/US2021/056469, Jan. 27, 2022, 6 pages.

* cited by examiner

PRESSURIZED VESSEL DISCHARGE MODIFIER

TECHNICAL FIELD

This disclosure relates generally to fluid spraying and, more particularly, to fluid spraying apparatuses including discharge modifiers for pressurized vessels.

BACKGROUND

A typical pressurized sprayer usually includes a pressurized vessel to hold fluid under pressure and provide a valved outlet for the fluid, and a discharge modifier in fluid communication with the valved outlet to modify output from the pressurized vessel. The pressurized vessel usually includes a container having a closed bottom, and sidewalls extending upwardly from the closed bottom and terminating in an open top. The pressurized vessel also usually includes a closure coupled to the open top of the container and carrying the valved outlet, which includes an internal valve assembly having a valve stem extending out of the pressurized vessel. The discharge modifier usually includes a body having a through passage including a single inlet coupled to the valve stem and a single outlet in fluid communication with the inlet to produce a desired spray pattern.

SUMMARY

According to an embodiment of the present disclosure, a discharge modifier for a pressurized vessel includes a fitment, including a base wall having a base aperture, a radially outer skirt extending axially away from the base wall in an inward direction, a radially inner skirt extending axially away from the base wall in the inward direction, and a plurality of circumferentially extending inner walls extending axially away from the base wall in an outward direction. A manifold is supported by the fitment, and includes a cylinder having an axially lower end, an axially upper end, a radially outer surface, an inlet at the lower end, and an axial passage extending between the lower and upper ends. A plurality of spray barrels extending radially outwardly with respect to the cylinder, and including a plurality of barrel passages in fluid communication with the axial passage of the cylinder. A distributor is rotatably carried by the manifold, and includes an axial conduit including an inlet and an outlet and in fluid communication with the inlet via an axial passage extending therebetween, and also includes a center support rotatably carried in the axial passage of the cylinder of the manifold and including a transverse passage in fluid communication with the axial passage and having an outlet. An overcap is rotatably coupled to the fitment, and includes a base wall, a circumferentially extending skirt extending away from the base wall, and an outlet in the skirt to substantially circumferentially align with one of the spray barrels in a spray mode of the discharge modifier.

According to another embodiment of the present disclosure, a discharge modifier fitment includes a base wall having a base aperture, a radially inner skirt extending axially away from the base wall in an axially inward direction, a radially outer skirt extending axially away from the base wall in the axially inward direction and being axially longer than the radially inner skirt, and a plurality of circumferentially extending inner walls extending axially away from the base wall in an outward direction and having a plurality of circumferential spaces therebetween.

According to a further embodiment of the present disclosure, a discharge modifier manifold includes a cylinder including an axially lower end, an axially upper end, a radially outer surface, an inlet at the lower end, and an axial passage extending between the lower and upper ends. A plurality of spray barrels extending radially outwardly with respect to the manifold cylinder, and including a plurality of barrel passages in fluid communication with the axial passage of the manifold cylinder.

According to an embodiment of the present disclosure, a discharge modifier overcap includes a base wall, a circumferentially extending skirt extending away from the base wall and including an outlet, and at least one rib extending axially along an inside surface of the skirt and terminating in a flexible detent flange.

DETAILED DESCRIPTION

Figure 1:
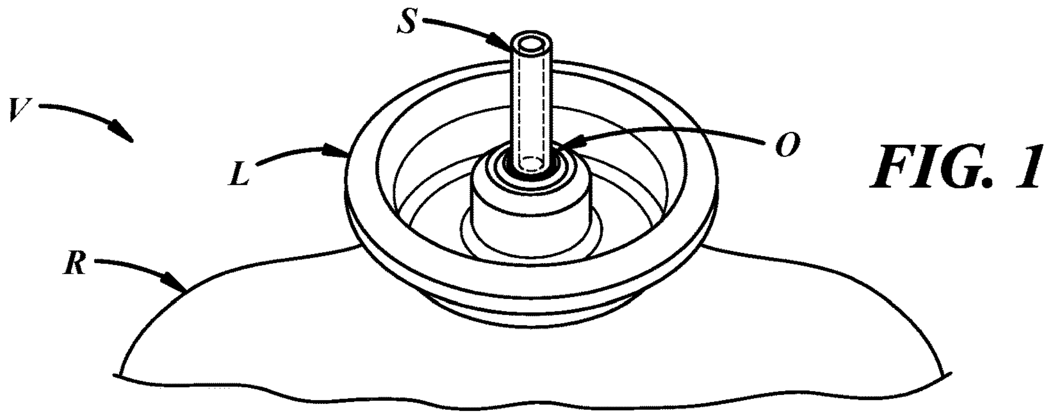
FIG. 1 illustrates a fragmentary, upper, perspective view according to an illustrative embodiment of a pressurized vessel for a pressurized sprayer and including a container and a valved closure having a valve stem.

FIG. 1 shows an illustrative embodiment of a pressurized vessel V. The pressurized vessel V is configured for holding a pressurized fluid, including, but not limited to, paints, adhesives, sealants, lubricants, hair spray or other personal care products, household deodorants or disinfectants, cooking spray, oven cleaner, or any other suitable fluid. In the illustrated embodiment, the pressurized vessel includes a container R and a closure L coupled to the container R and that may carry a valved outlet O and also may carry an internal valve assembly (not shown) having a valve stem S extending out of the pressurized vessel V. In other embodiments, the closure L may be coupled directly to the container R or may be indirectly coupled to the container R via a dome or other intermediate component. Pressurized vessels and valve assemblies are well known in the art, and any pressurized vessels and valve assemblies suitable for use with the presently disclosed discharge modifier 10 may be used.

With reference to FIGS. 2-7, a discharge modifier 100 may be a multi-outlet sprayer selectively arrangeable to provide different discharge characteristics according to one or more spray parameters, like spray pattern shape or size, spray flow, or the like. The discharge modifier 100 may include the following components. A collar or fitment 102 configured to be coupled to and supported by a pressurized vessel, for example, the vessel V of FIG. 1. More specifically, the fitment 102 may be configured for interference fit to the closure L of the pressurized vessel V of FIG. 1. A multi-outlet orifice switch or manifold 104 may be carried by the fitment 102. A finger pad valve or distributor 106 may be rotatably carried in the manifold 104 and coupled to the outlet valve stem S of the pressurized vessel V of FIG. 1. A shroud or overcap 108 may be rotatably coupled to the fitment 102 and coupled to the distributor 106 to rotate the distributor 106.

Figure 2:
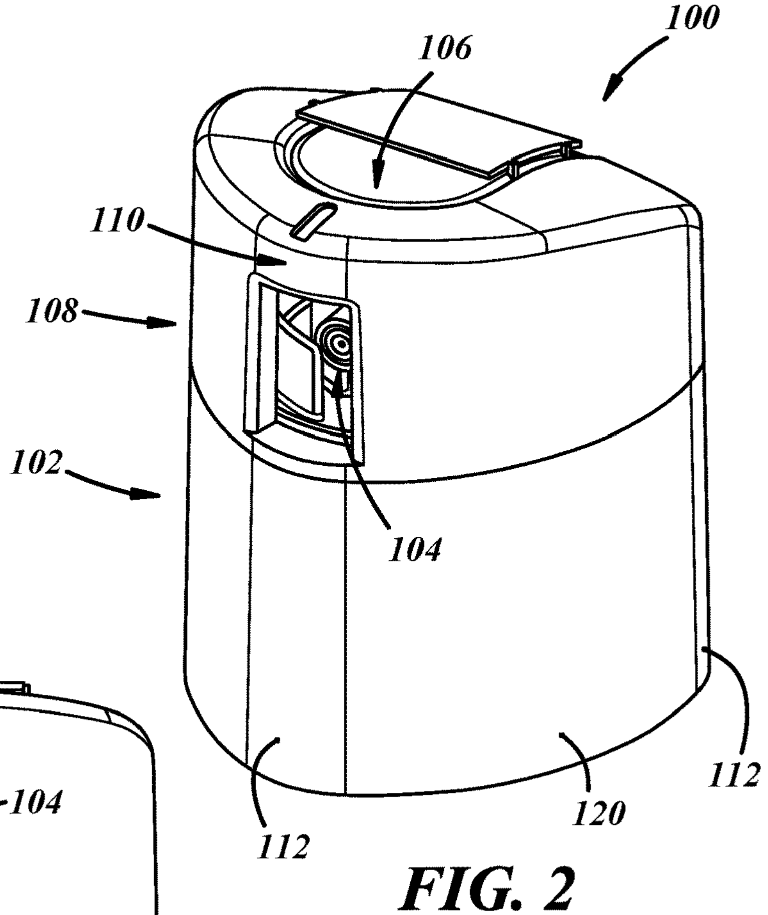
FIG. 2 illustrates an upper perspective view of a discharge modifier for a pressurized sprayer and shown in an on or unlocked mode and including a fitment configured to be coupled to the valved closure of the pressurized vessel of FIG. 1, an overcap rotatably carried by the fitment, a manifold supported by the fitment between the fitment and the overcap, and a distributor coupled to the overcap between the overcap and the manifold and configured to be coupled to the valve stem of the pressurized vessel of FIG. 1 and in fluid communication with the valve stem and the manifold.
Figure 3:
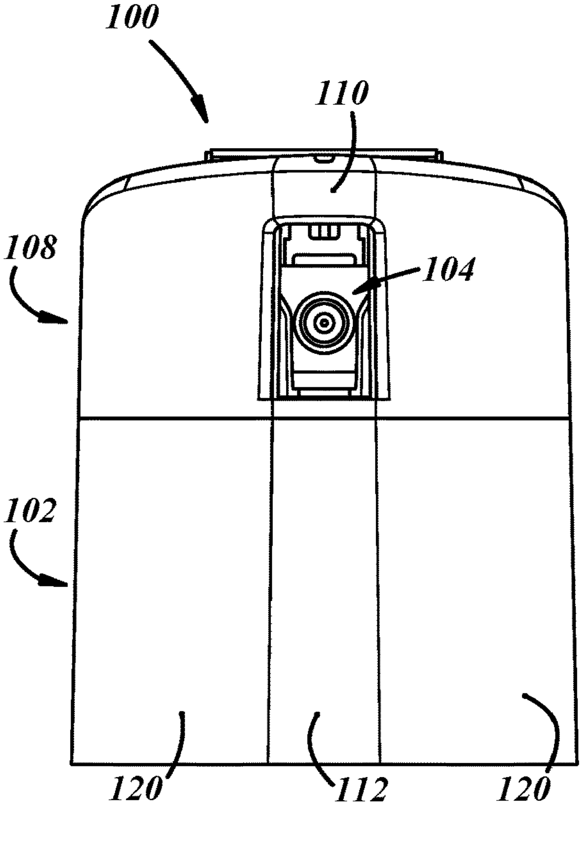
FIG. 3 illustrates a front elevational view of the discharge modifier of FIG. 2 in the on or unlocked mode.
Figure 4:
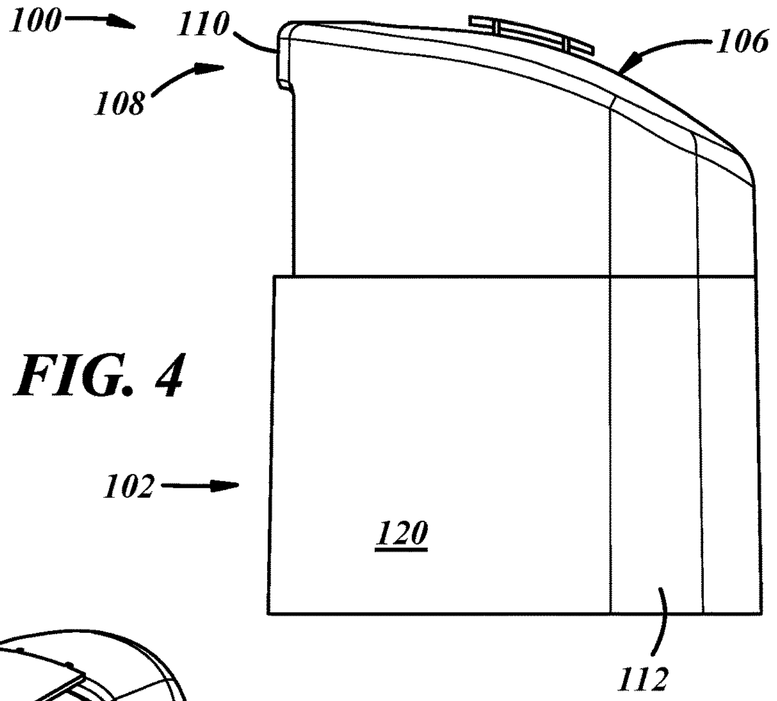
FIG. 4 illustrates a left side elevational view of the discharge modifier of FIG. 2 in the on or unlocked mode.
Figure 5:
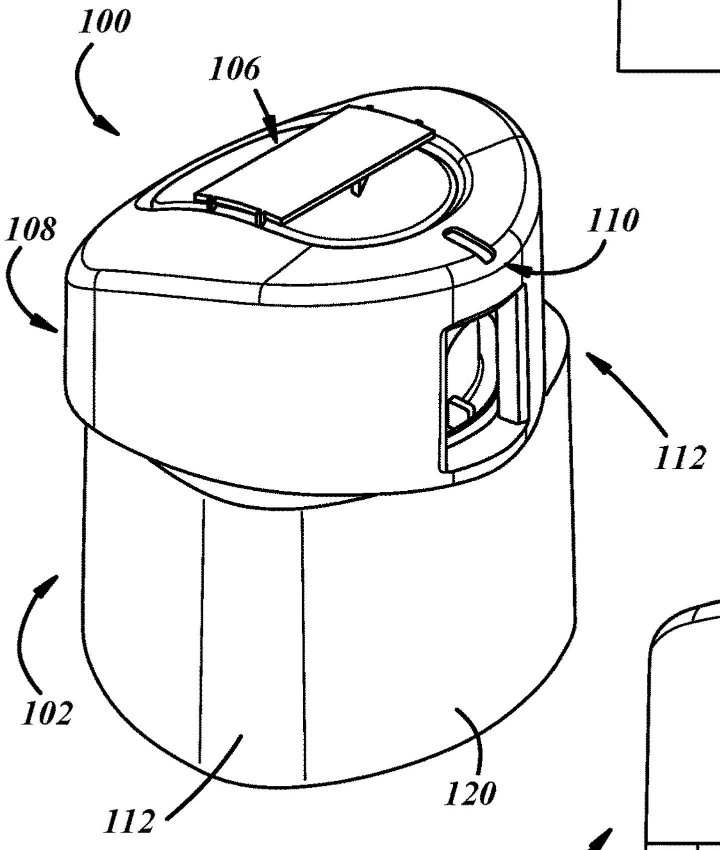
FIG. 5 illustrates an upper perspective view of the discharge modifier of FIG. 2 shown in an off or locked mode.
Figure 6:
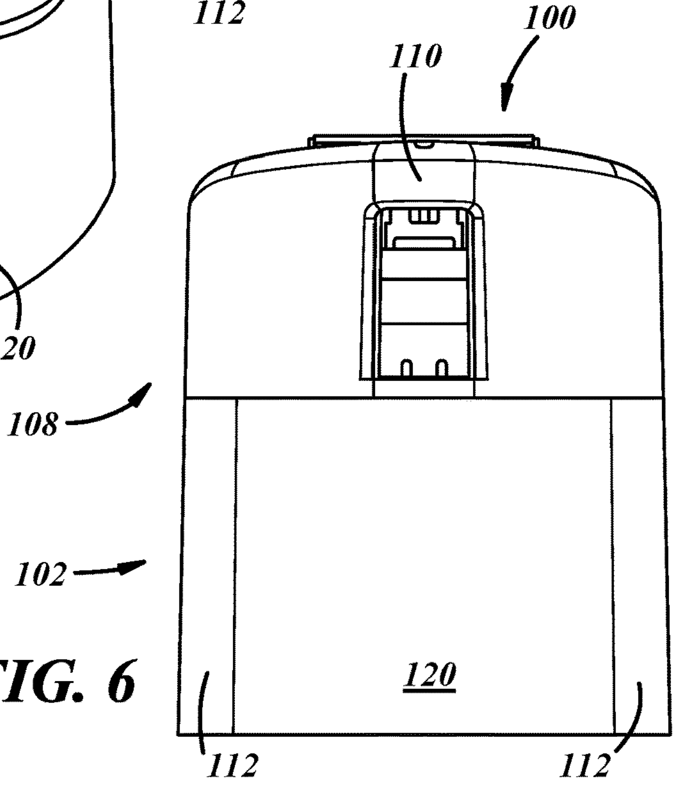
FIG. 6 illustrates a front elevational view of the discharge modifier of FIG. 2 in the off or locked mode.
Figure 7:
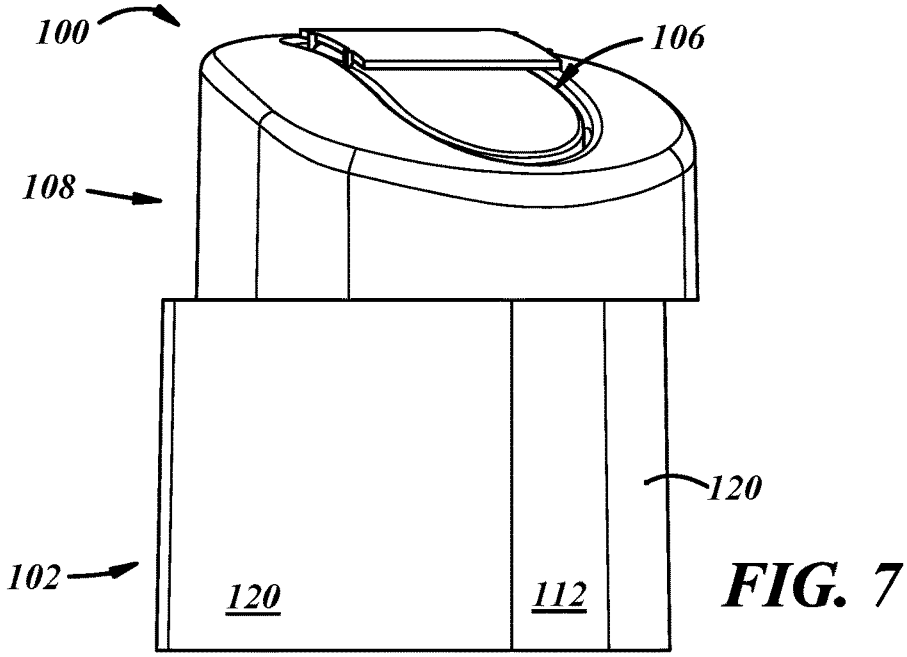
FIG. 7 illustrates a left side elevational view of the discharge modifier of FIG. 2 in the off or locked mode.

In FIGS. 2-4, the overcap 108 is rotated with respect to the fitment 102 in one of multiple "on" or spray or unlocked positions wherein an apex 110 of the overcap 108 is substantially circumferentially aligned with a circumferential center of one of multiple fitment lobes 112. As used herein, the phrase "substantially circumferentially aligned" means circumferentially aligned within plus or minus five angular degrees. In FIGS. 5-6, the overcap 108 is rotated with respect to the fitment 102 in one of three intermediate "off" or closed or locked positions wherein the apex 110 of the overcap 108 is substantially circumferentially aligned between circumferentially adjacent fitment lobes 112.

With reference to FIGS. 8-11, the fitment 102 includes a base wall 114 including a base aperture 116, and from which an outer skirt 118 downwardly depends for engagement, or perhaps mere correspondence, with a pressurized vessel. The outer skirt 118 may be multi-lobed, e.g., tri-lobed and, likewise, an upper end of the pressurized vessel V (FIG. 1) may be multi-lobed. The illustrated outer skirt 118 has multiple, e.g., three, circumferentially longer arcuate walls 120 and multiple, e.g., three, circumferentially shorter lobes 112 circumferentially interspersed between the arcuate walls 120. Notably, the radially outer skirt 118 need not be, and preferably is not, fastened to the pressurized vessel V (FIG. 1).

Figure 11:
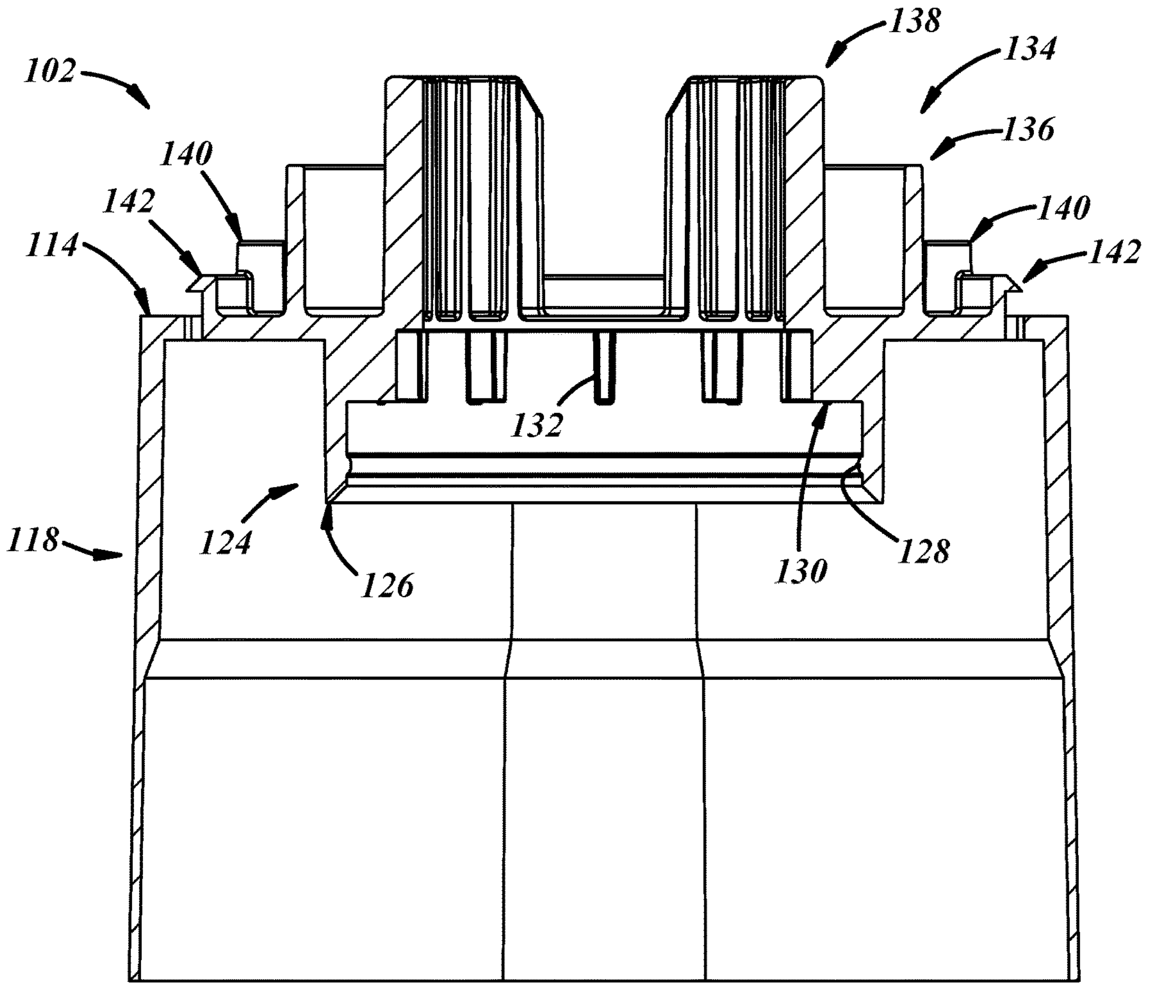
FIG. 11 illustrates a further enlarged elevational cross-sectional view of the fitment of FIG. 8.
Figure 12:
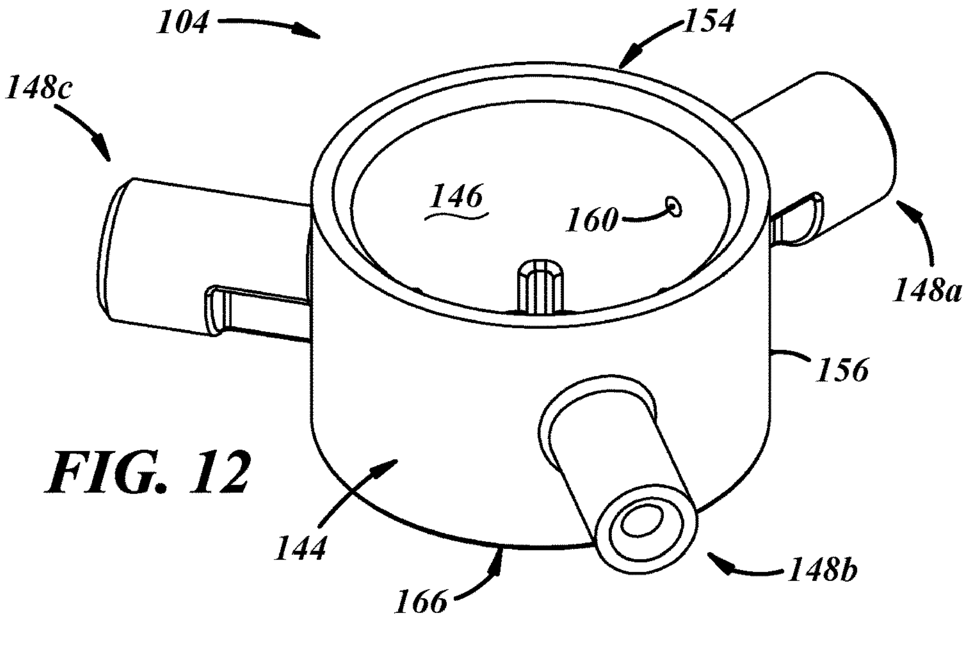
FIG. 12 illustrates an enlarged upper perspective view of the manifold of the discharger modifier of FIG. 2.
Figure 13:
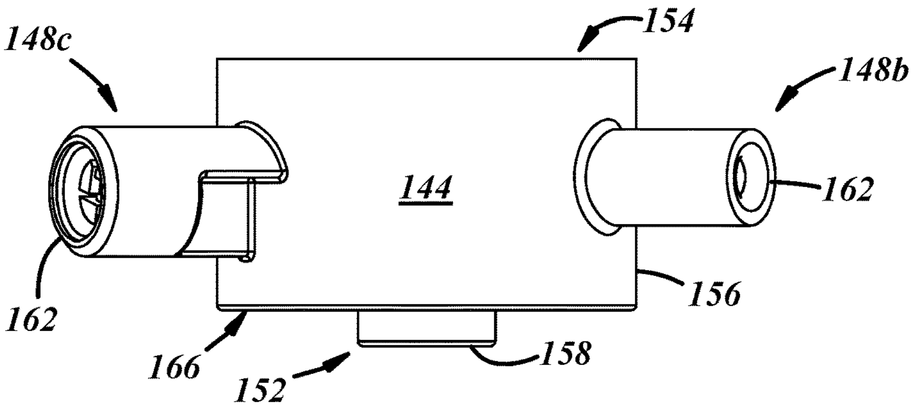
FIG. 13 illustrates a side elevational view of the manifold of FIG. 12.
Figure 14:
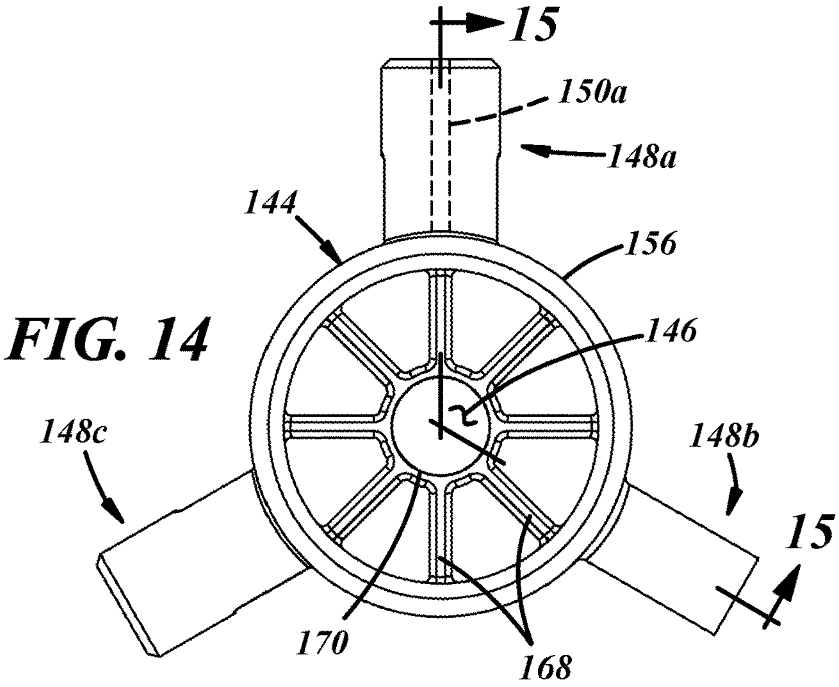
FIG. 14 illustrates a top view of the manifold of FIG. 12.

Also, with reference particularly to FIG. 11, the fitment 102 may include a cylindrical inner skirt 124 downwardly or inwardly from the base wall 114 and including a free end 126 that may be fastened to the pressurized vessel V (FIG. 1). For example, the inner skirt 124 may include a radially inwardly and circumferentially extending projection or bead 128 for interference fit to a radially outwardly projecting rim of the closure portion L of the pressure vessel V (FIG. 1). The inner skirt 124 and/or the bead 128 may be circumferentially continuous or interrupted. A locating shoulder 130 may be established between the base wall 114 and the inner skirt 124, for example, by a plurality of circumferentially spaced ribs 132, which may extend axially inwardly from the base wall 114 and radially inwardly from the inner skirt 124. In other embodiments, the inner skirt 124 may be fastened to the pressurized vessel V (FIG. 1) in any other suitable manner.

With continued reference to FIGS. 8-11, a plurality of circumferentially extending and circumferentially spaced semi-cylindrical walls 134 extend upwardly from the base wall 114. The semi-cylindrical walls 134 may include three outer walls 136 and three inner walls 138 radially spaced from the outer walls 136 and having circumferential centers substantially circumferentially aligned with circumferential centers of the arcuate walls 120 of the outer skirt 118, such that circumferential spaces between the semi-cylindrical walls 134 are substantially circumferentially aligned with circumferential centers of the lobes 112 of the skirt 118. The inner walls 138 may be axially taller than the outer walls 136.

Also, detent features 140 are carried in locations substantially circumferentially aligned with the centers of the semi-cylindrical walls 134. For example, the detent features 140 may include projections extending upwardly from the base wall 114. Such detent projections may include a plurality, e.g., three, pairs of circumferentially spaced flanges or ribs having free ends, wherein the ribs are axially shorter than the outer walls 136. Spaces between the pairs of the detent projections may be substantially circumferentially aligned with circumferential centers of the walls 134. In other embodiments, the detent features 140 may be in the form of reliefs instead of the illustrated projections.

Additionally, the fitment 102 may include one or more overcap retention features 142. In the illustrated example, such retention features 142 may include snap beads projecting from and extending circumferentially around the base wall 114 radially outboard of the semi-cylindrical walls 134, and may be axially shorter than the outer wall 136 and the detent features 140. Circumferential centers of the snap beads may be substantially circumferentially aligned with the circumferential spaces between the inner walls 138 and the outer walls 136. In other embodiments, the retention features may include reliefs instead of the snap beads.

With reference now to FIGS. 12-16, the manifold 104 may include a cylinder 144 with an axial passage 146, and three circumferentially spaced spray barrels 148*a,b,c* extending radially outwardly from the manifold cylinder 144 and including transverse or radial spray passages 150*a,b,c* in selective fluid communication with the axial passage 146. The cylinder 144 includes an axially lower or inward end 152, an axially upper or outward end 154, a radially outer surface 156, an inlet 158 at the lower end 152. The radial spray passages 150*a,b,c* are in fluid communication with, and extend outwardly from the axial passage 146.

Figure 15:
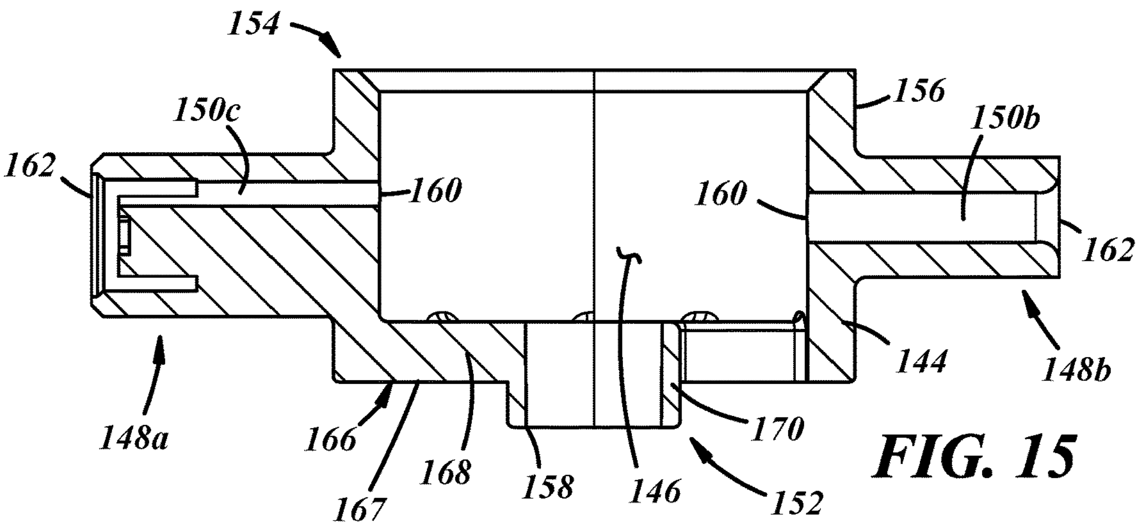
FIG. 15 illustrates a further enlarged cross-sectional view of the manifold of FIG. 12, taken along line 15-15 of FIG. 14.

With reference particularly to FIG. 15, the spray barrels 148*a,b,c* have radially inwardly facing inlets 160 of the spray passages 150*a,b,c* of the manifold cylinder 144, and outlets 162 at free ends of the spray barrels 148*a,b,c*. The spray barrels 148*a,b,c* may carry nozzle fitments (not shown) that may be interference fit or otherwise coupled to the outlets 162 thereof. For example, one of the spray barrels 148*a,b,c* may carry a small conical nozzle fitment, another one of the spray barrels 148*a,b,c* may carry a large conical nozzle fitment, and yet another one of the spray barrels 148*a,b,c* may carry a fan nozzle fitment. The spray barrels 148*a,b,c* may be of generally cylindrical shape and one or more of the spray barrels 148*a,b,c* may include notches 164 that may facilitate coring of the manifold 104 during molding, and as a failsafe to ensure desired alignment of the manifold 104 with respect to the fitment 102 in assembly. The manifold 104 also may include a base wall 166, which may be circumferentially continuous or, as illustrated, may be established by a plurality of spokes 168 extending radially inwardly from the lower end 152 of the manifold cylinder 144. The manifold 104 further may include a hub 170 at a radially inward portion of the base wall 166 and that may protrude downwardly beyond a lower surface 167 of the base wall 166. The hub 170 is in open communication with the axial passage 146 of the manifold cylinder 144, and may serve as a support bushing for a corresponding portion of the distributor 106 (FIG. 16) as will be described herein below.

With reference now to FIGS. 16-19, the distributor 106 includes an actuator portion 172 for cooperating with the overcap 108 (FIG. 20) and a user's finger, and a distributor portion 174 for cooperating with the actuator portion 172, the manifold 104, and the valve stem S of the pressurized vessel V (FIG. 1). Notably, the illustrated embodiment of the distributor 106 is preferably an integral single-piece component and is of complex geometry that is not substantially or essentially cylindrical.

The actuator portion 172 includes a base wall 176 that may be of oval shape in plan view and may be generally excurvate in side view with a dimple 177 for locating a user's finger. As such, the base wall 176 may constitute a finger pad. The actuator portion 172 also may include circumferentially spaced overcap guide features 178 for guided coupling of the distributor 106 with respect to the overcap 108. The guide features 178 may include multiple, e.g., three or four, guide blades extending radially outwardly from the base wall 176 and axially inwardly from the base wall 176. In other embodiments, the guide features 178 may include pairs of guide flanges, instead of the guide blades. The actuator portion 172 additionally may include a relatively short guide skirt 180 extending downwardly/inwardly away from the base wall 176 around at least a portion of a perimeter thereof.

Figure 19:
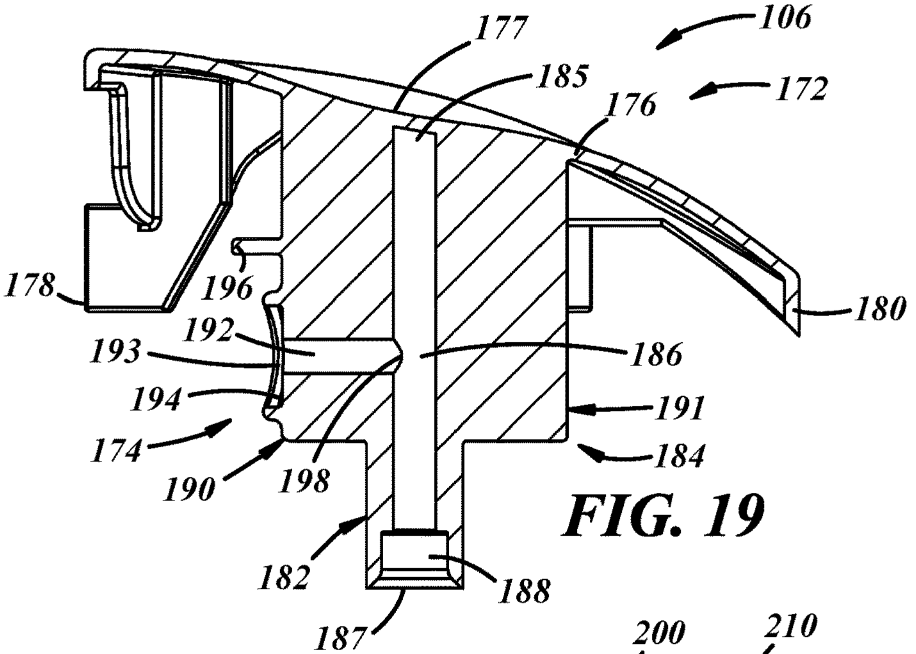
FIG. 19 illustrates a further enlarged cross-sectional view of the distributor of FIG. 16, taken along line 19-19 of FIG. 18.
Figure 20:
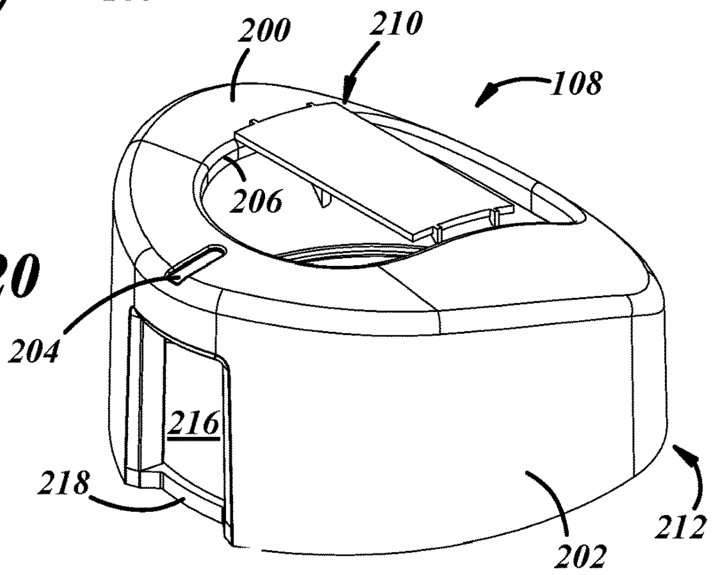
FIG. 20 illustrates an enlarged upper frontal perspective view of the overcap of the discharge modifier of FIG. 2.
Figure 21:
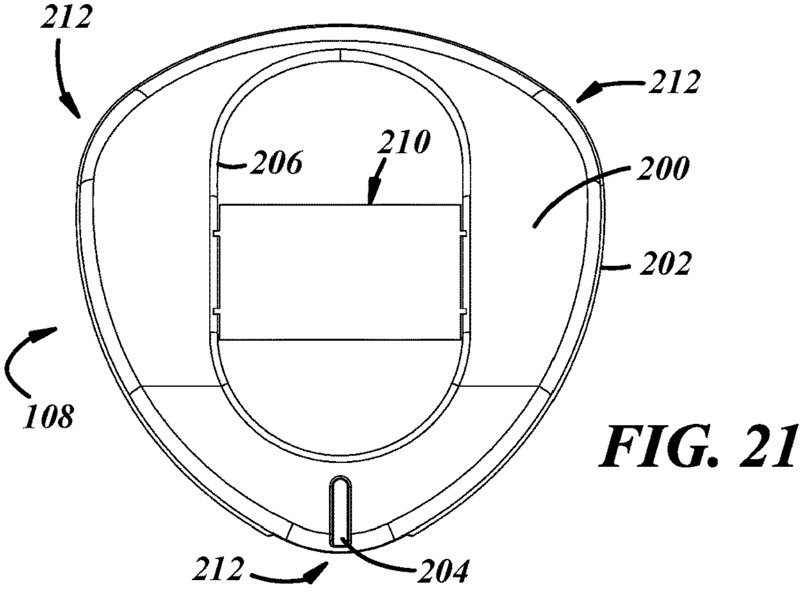
FIG. 21 illustrates a top view of the overcap of FIG. 20.
Figure 22:
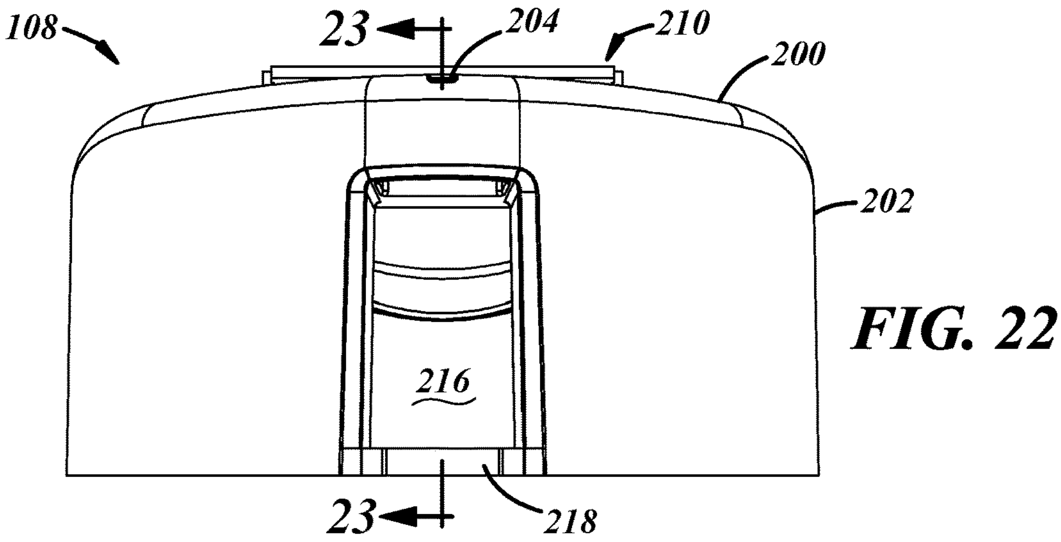
FIG. 22 illustrates a further enlarged front view of the overcap of FIG. 20.

With reference particularly to FIG. 19, the distributor portion 174 may include an axial conduit 182 extending away from an inside surface of the base wall 176 and a center support 184 also extending away from the inside surface of the base wall 176 but also extending radially and axially away from the axial conduit 182. The axial conduit 182 includes an axial passage 186 extending axially from a closed upper end 185 of the axial conduit to an open lower end 187 of the conduit 182. The axial conduit 182 may include an inlet 188 in the open lower end 187 thereof for coupling to the valve stem S of the pressurized vessel V (FIG. 1). The inlet 188 may be in the form of a counterbore. The center support 184 may include excurvate T-shaped wings 190, 191 extending radially outwardly from the axial conduit 182. A front curved T-shaped wing 190 carries a radial or transverse passage 192 in fixed fluid communication with the axial passage 186 of the axial conduit 182. The transverse passage 192 includes an outlet 193 in a counterbore pocket 194 in the front wing 190 to receive a seal, e.g., an O-ring, (not shown) and also includes a circumferentially extending rib 196 over the counterbore pocket 194. The rib 196 provides a spray guard to prevent leaks from spraying up toward a user of the product. A rear curved T-shaped wing 191 supports, and facilitates centering of, the center support 184 and the axial conduit 182 in the axial passage 146 of the manifold 104 (FIG. 15). Notably, the distributor portion 174 may include a circumferentially continuous lower end such that there is no axially extending notch therein, and the axial passage 186 is dead-headed at the upper end 185 thereof proximate the base wall 176 and preferably includes only a single outlet 198 in a location between the upper and lower ends 185, 187 of the passage 186.

With reference now to FIGS. 20-23, the overcap 108 includes a base wall 200 and a radially outer skirt 202 extending axially downwardly or inwardly from the base wall 200. The base wall 200 may be excurvate in elevational view and multi-lobed, e.g., tri-lobed, in plan view. The overcap base wall 200 also includes a guide feature 204 at a front end that may be an elongated indentation as shown or any other suitable guide feature. The overcap base wall 200 further includes an aperture 206 for receiving the base wall 176 of the distributor 106 (FIG. 19) and that may correspond in shape to the plan view shape of the base wall 176 of the distributor 106, for, example, oval. Additionally, the overcap 108 may include a short guide skirt 208 (FIG. 23) extending axially downwardly/inwardly from the base wall 200 around the aperture 206 for cooperating with the corresponding guide skirt 180 of the distributor 106 (FIG. 19). The overcap 108 may include a tamper-evident bridge 210 spanning across the aperture 206 in the base wall 200. The bridge 210 may be frangibly connected to the base wall 200, and may be removable by pulling the bridge 210 away from the base wall 200 to break the frangible connection therebetween.

Figure 23:
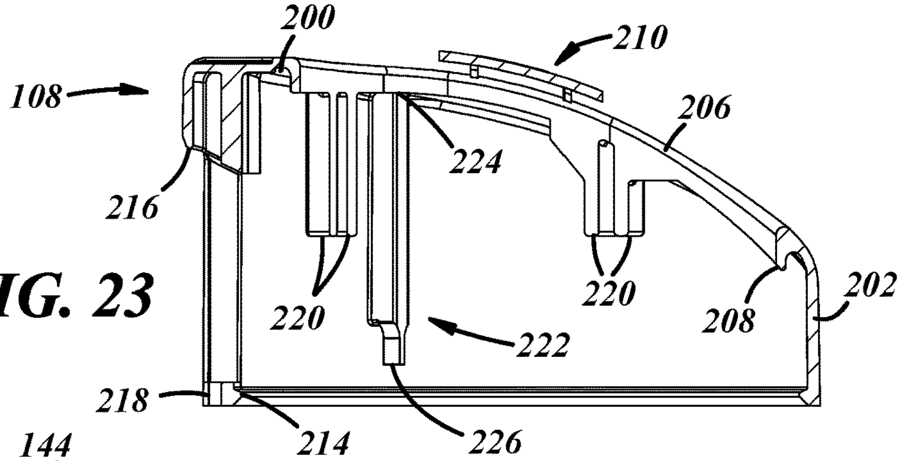
FIG. 23 illustrates an elevational cross-sectional view of the overcap of FIG. 20, taken along line 23-23 of FIG. 22.

With reference particularly to FIG. 23, like the base wall 200, the radially outer skirt 202 may be multi-lobed, e.g., tri-lobed, in plan view, with multiple lobes 212. Also, the skirt 202 may have one or more fitment retention features 214. For example, the fitment retention features 214 may include one or more snap beads for snap fit cooperation with the overcap retention features 142 (e.g. snap-fit beads) of the fitment 102 (FIG. 11). Also, the skirt 202 includes a discharge aperture 216, which may have a circumferential center that substantially circumferentially aligns with circumferential centers of the spray nozzles 148*a,b,c* of the manifold 104 (FIG. 12) and of the lobes 112 of the fitment 102 (FIG. 2) when rotated to the distinct circumferential positions. The discharge aperture 216 may be open to a free end of the skirt 202 or, as shown, may be closed by a circumferentially extending bridge 218 at the free end of the skirt 202.

Figure 16:
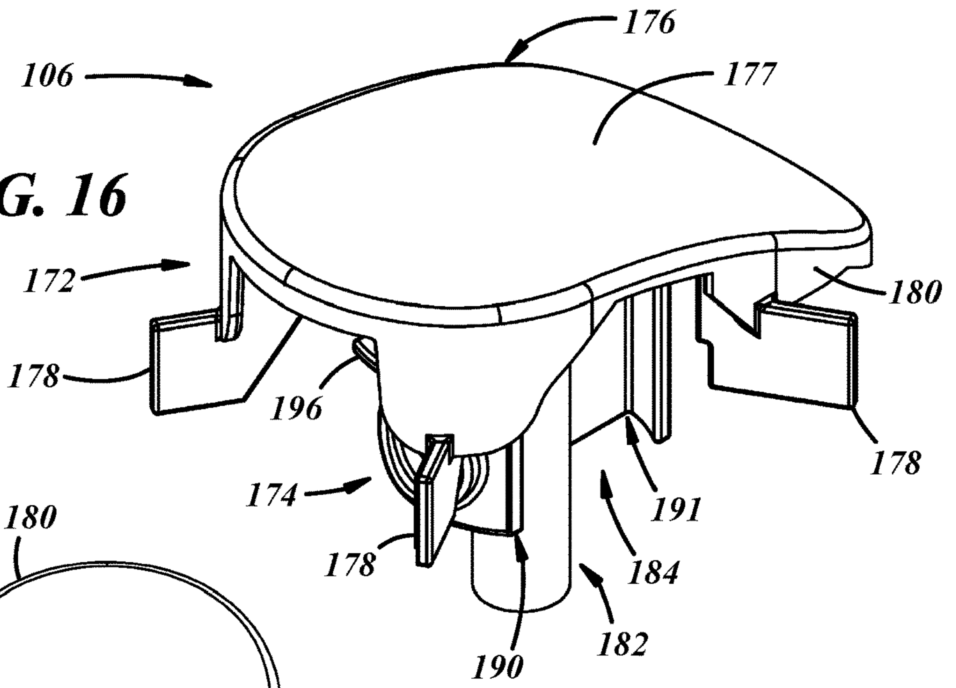
FIG. 16 illustrates an enlarged upper frontal perspective view of the distributor of the discharge modifier of FIG. 2.
Figure 17:
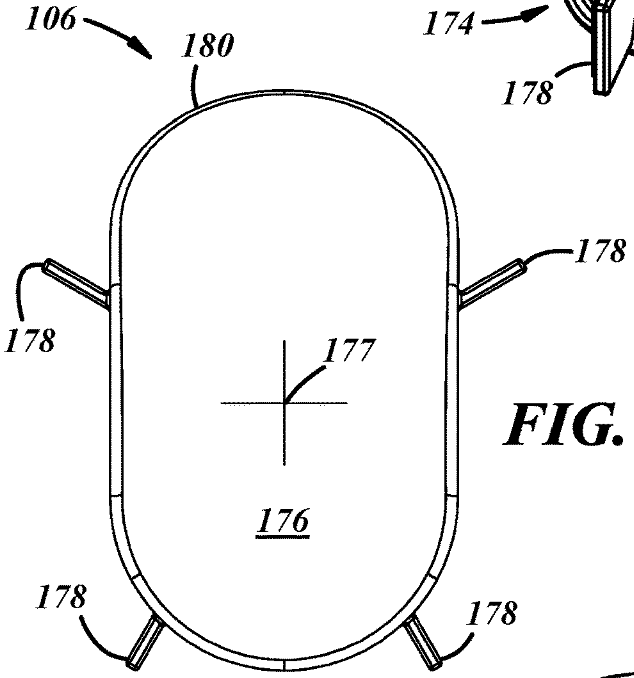
FIG. 17 illustrates a top view of the distributor of FIG. 16.
Figure 18:
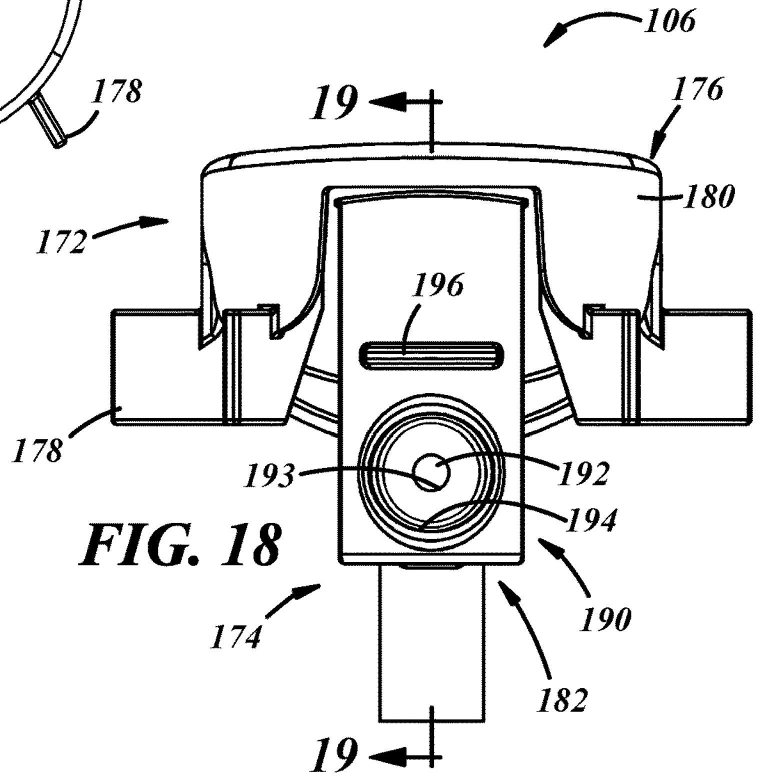
FIG. 18 illustrates a further enlarged front view of the distributor of FIG. 16.

Also, the overcap 108 includes multiple distributor guide features 220 for cooperating with the corresponding guide features 178 of the distributor 106 (FIG. 16). In the illustrated embodiment, the guide features 220 include circumferentially spaced flange pairs extending downwardly from an inside surface of the base wall 206 and alongside an inside surface of the skirt 202 to receive the corresponding guide features 220 of the distributor 106 (FIG. 16). In other embodiments, the overcap guide features 220 may include guide blades and the distributor guide features 220 may include spaced flange pairs. Notably, however, the overcap 108 preferably is not inelastically deformed to operably connect to the actuator portion 172 of the distributor 106 (FIG. 19).

Figure 8:
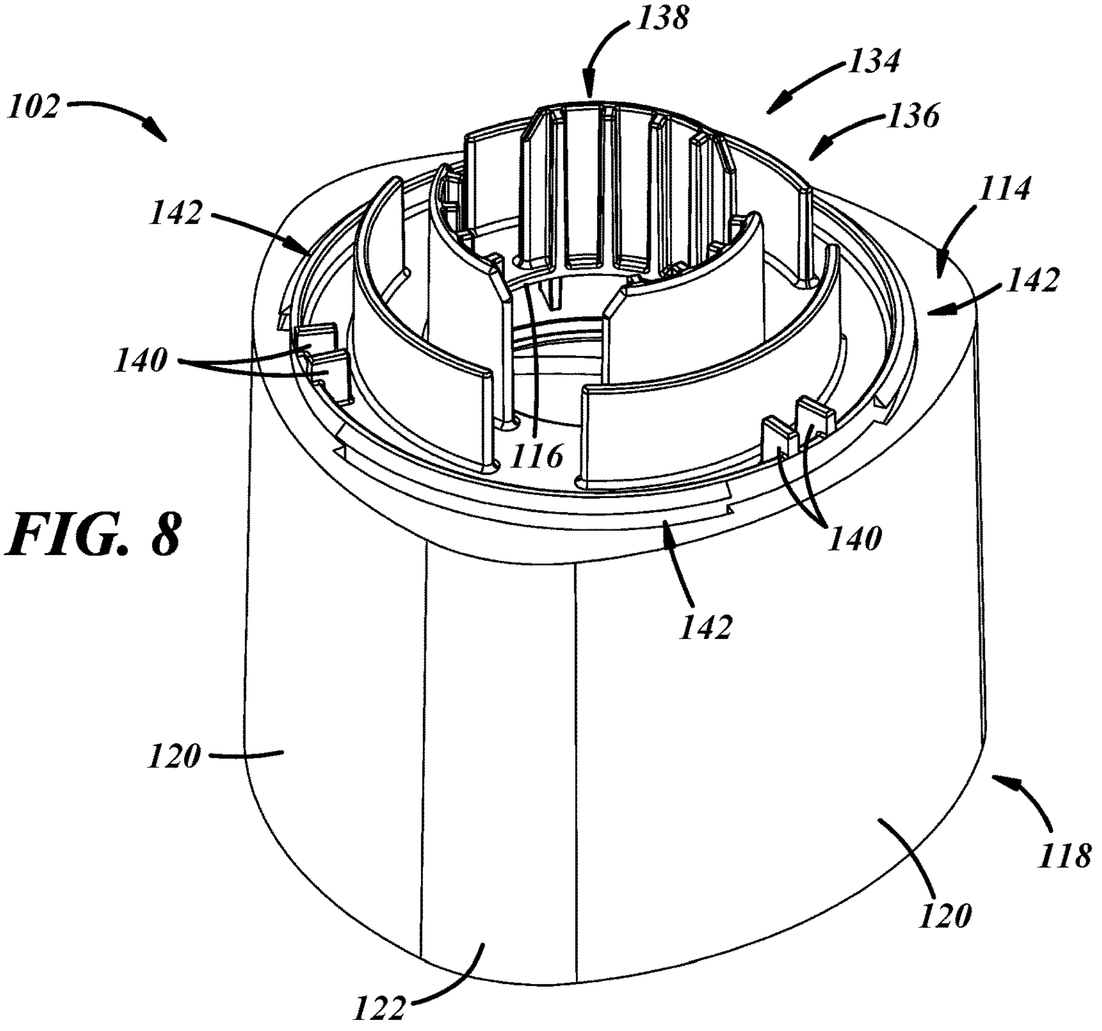
FIG. 8 illustrates an enlarged upper perspective view of the fitment of the discharge modifier of FIG. 2.
Figure 9:
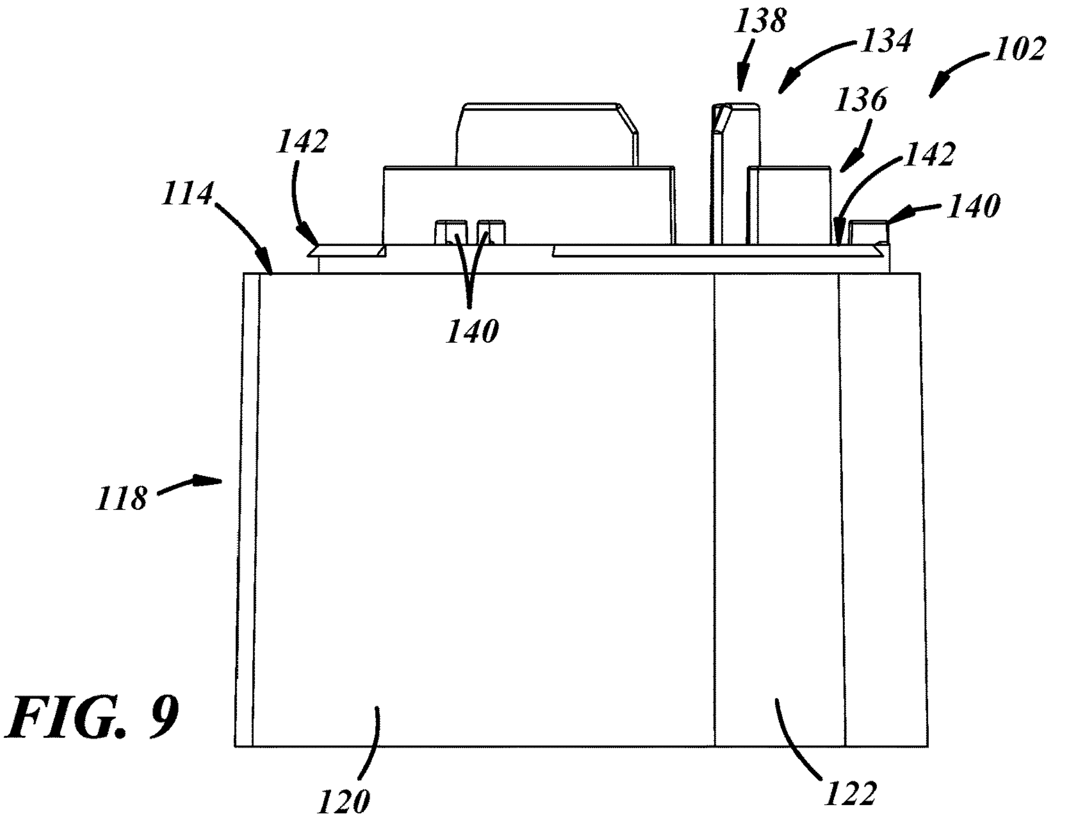
FIG. 9 illustrates a side elevational view of the fitment of FIG. 8.
Figure 10:
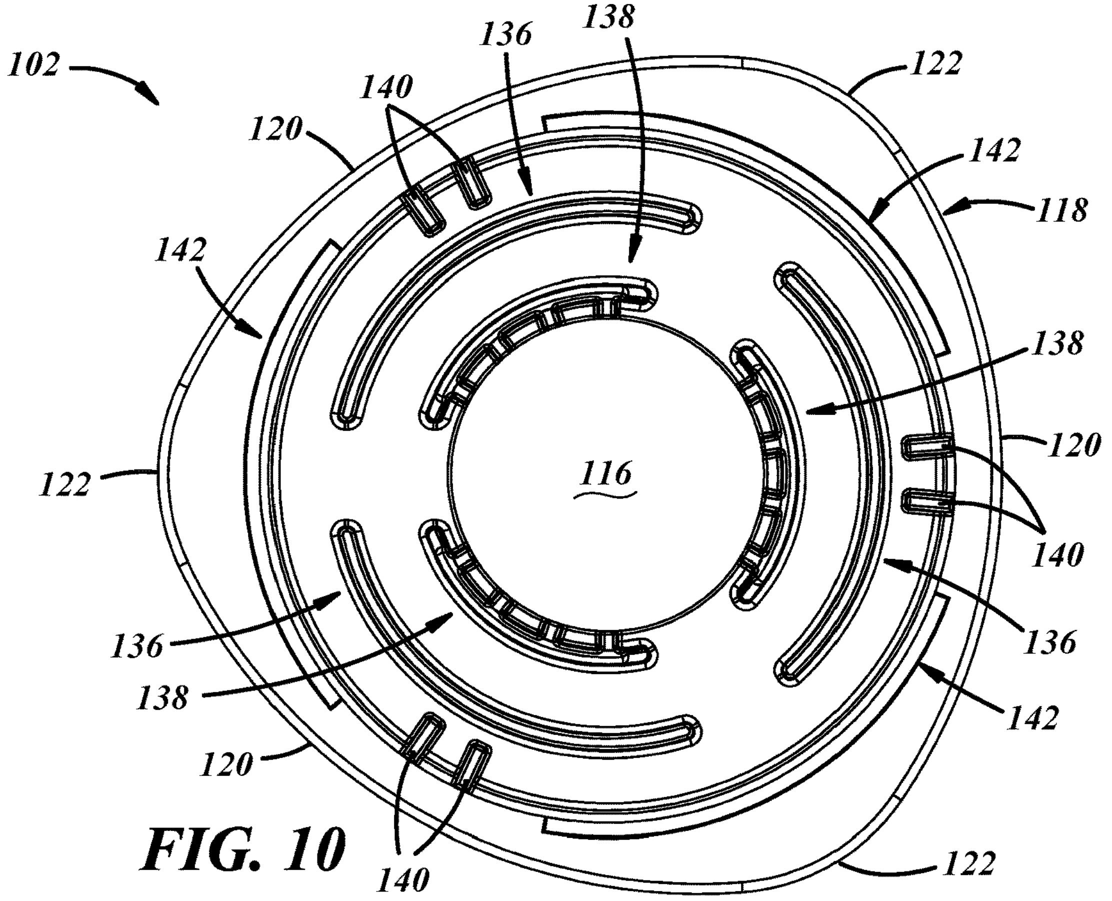
FIG. 10 illustrates a further enlarged top view of the fitment of FIG. 8.

Additionally, the overcap 108 includes one or more fitment detent features 222 for cooperation with the detent features 140 of the fitment 102 (FIG. 8) to hold the overcap 108 in multiple distinct circumferential positions on the fitment 102. The detent features 222 may include tangs having fixed ends 224 fixed to a rib or other structure of the overcap 108 and free ends in the form of flexible detent flanges or click ribs 226 that may be free to flex into and out of spaces between the corresponding detent features 140 of the fitment 102 (FIG. 8). In other embodiments, the fitment 102 may include detent tangs and the overcap 108 may include detent reliefs. In yet other embodiments, any suitable detent features may be carried by the fitment 102 and the overcap 108 to provide the multiple circumferential detent positions.

Figure 24:
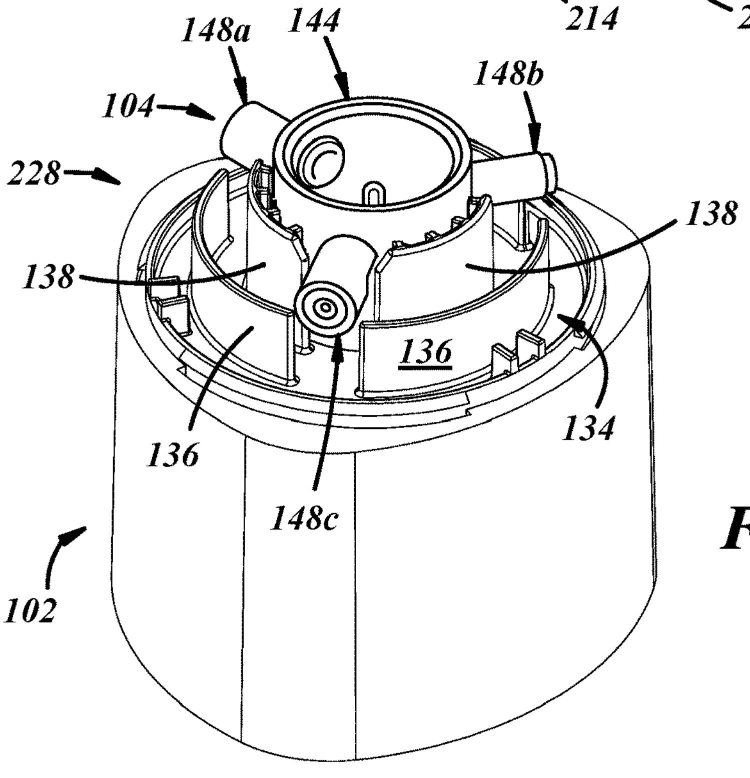
FIG. 24 illustrates an enlarged upper perspective view of a subassembly including the fitment carrying the manifold of the discharge modifier of FIG. 2.
Figure 25:
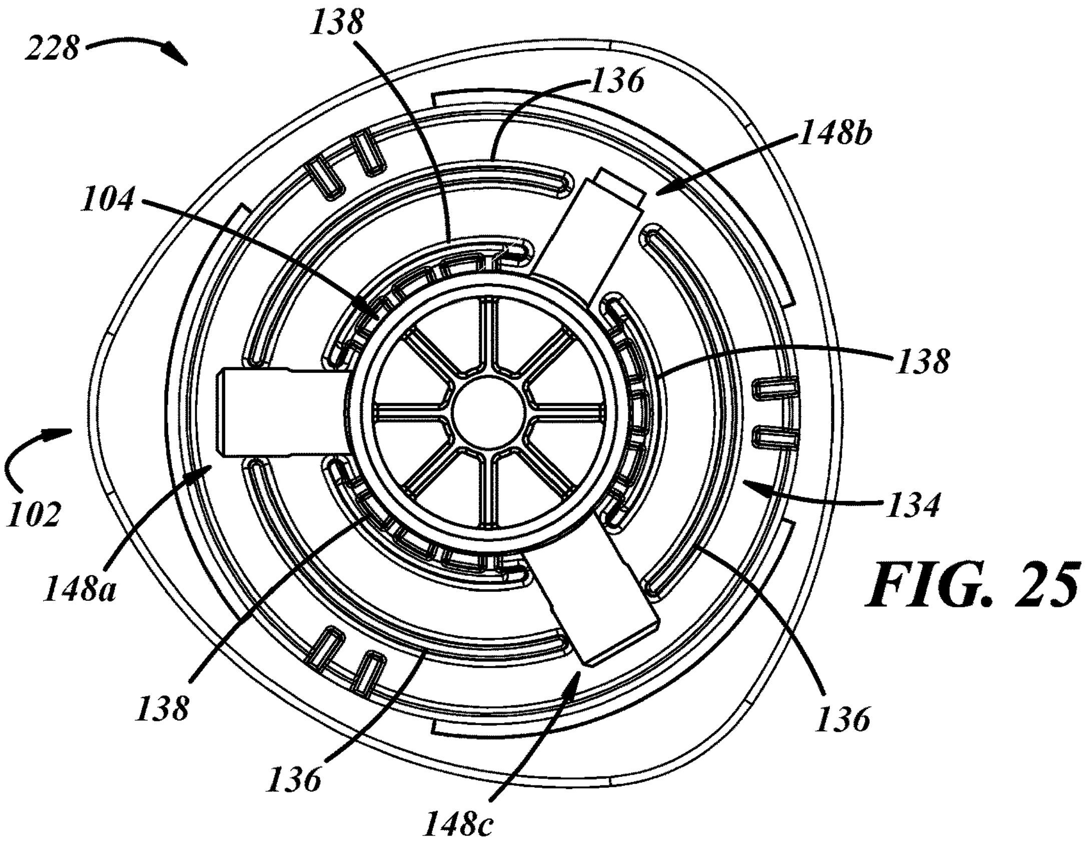
FIG. 25 illustrates a further enlarged top view of the fitment and manifold subassembly of FIG. 24.
Figure 26:
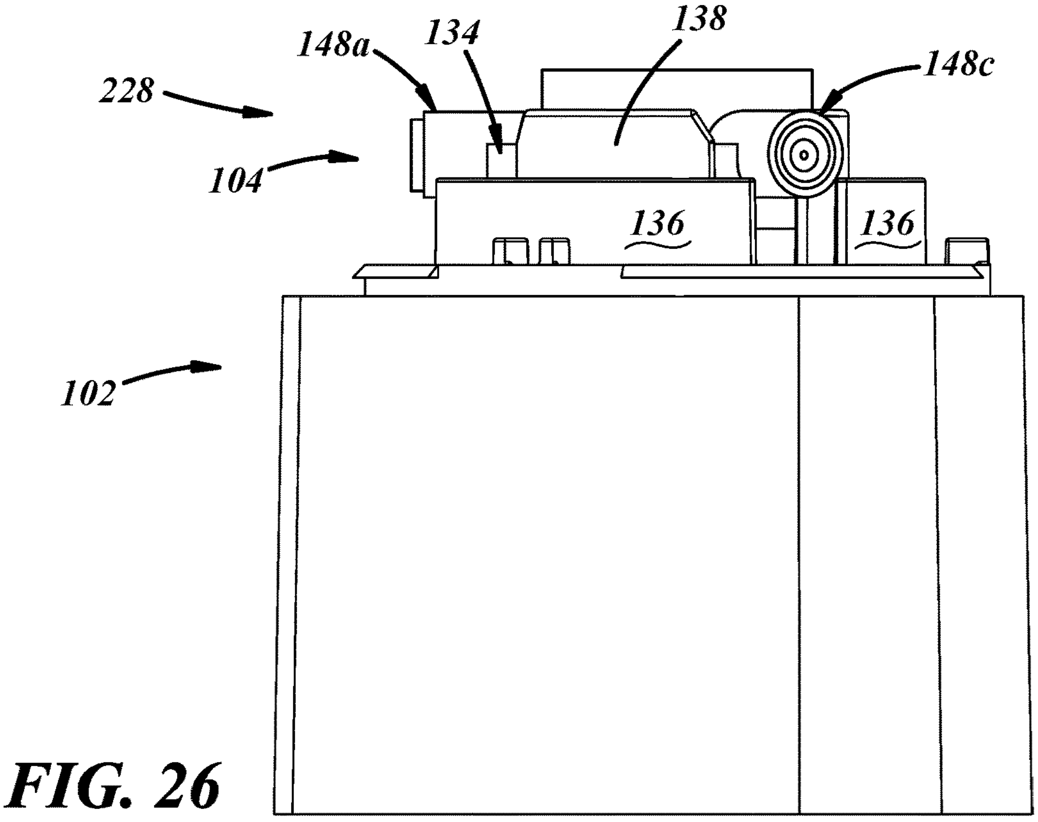
FIG. 26 illustrates a further enlarged side view of the fitment and manifold subassembly of FIG. 24.
Figure 27:
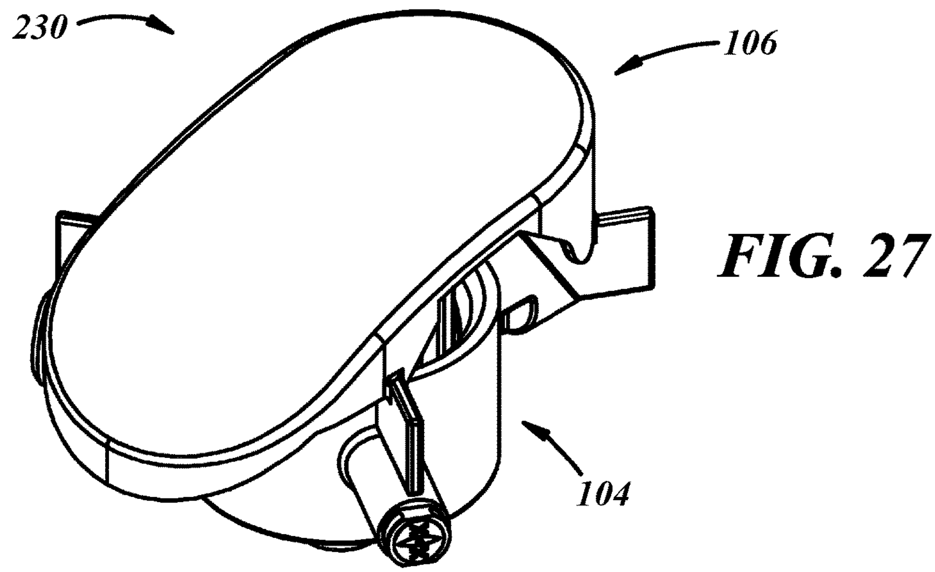
FIG. 27 illustrates an enlarged upper perspective view of a subassembly including the distributor carrying the manifold of the discharge modifier of FIG. 2.
Figure 28:
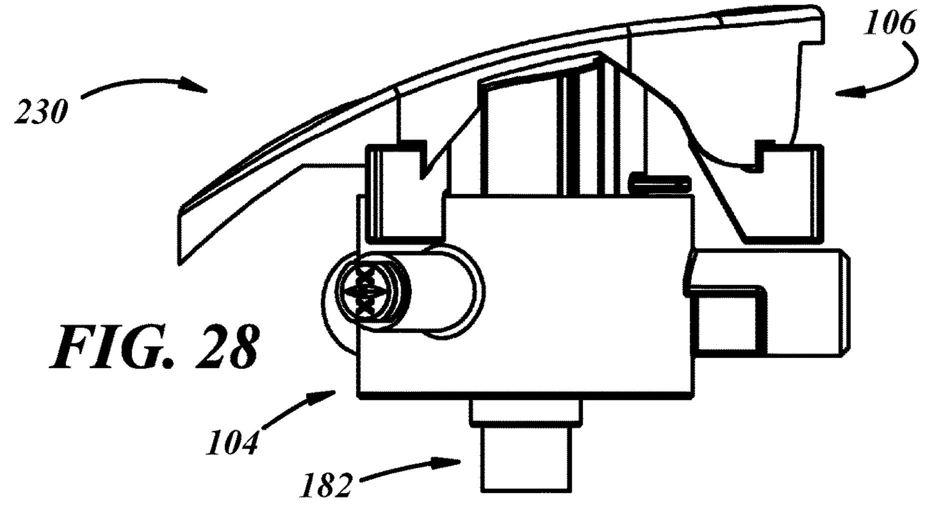
FIG. 28 illustrates a right side elevational view of the distributor and manifold subassembly of FIG. 27.
Figure 29:
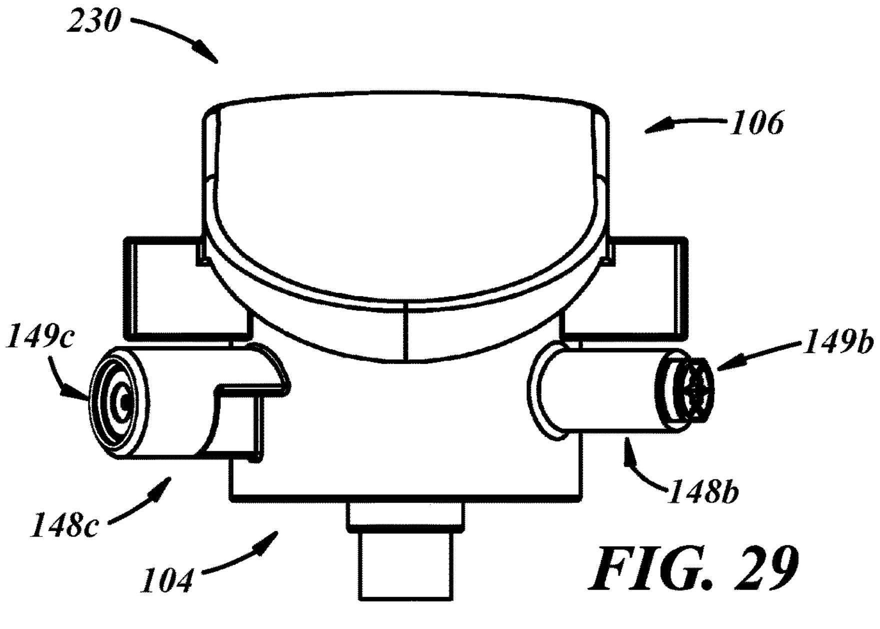
FIG. 29 illustrates a rear elevational view of the distributor and manifold subassembly of FIG. 27.
Figure 30:
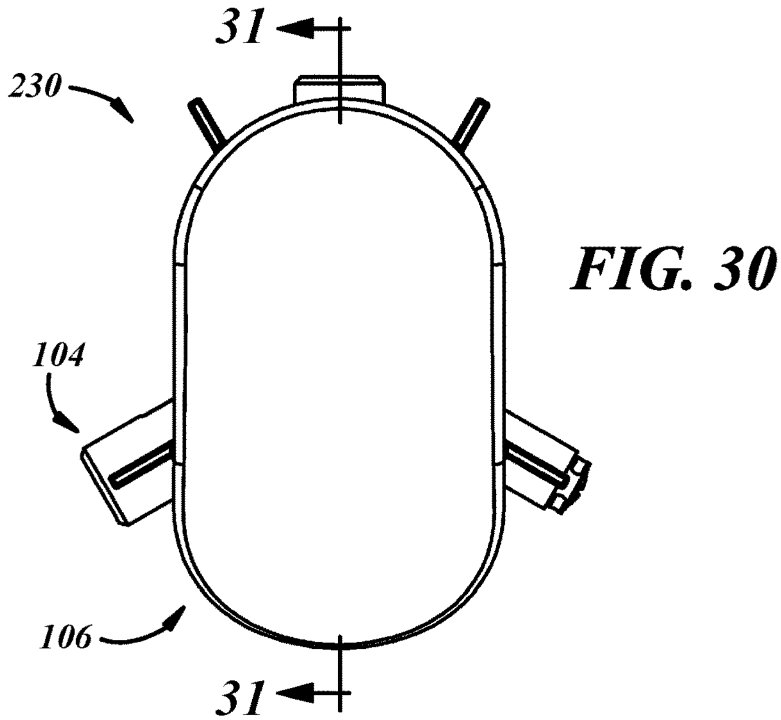
FIG. 30 illustrates a top view of the distributor and manifold subassembly of FIG. 27.

With reference now to FIGS. 24-26, in an illustrated embodiment of a discharge modifier sub-assembly 228, the cylinder 144 of the manifold 104 is carried radially inwardly of the semi-cylindrical inner walls 134 of the fitment 102. Also, the spray barrels 148*a,b,c* extend through circumferential spaces between the inner walls 138 and have circumferential centers that may substantially circumferentially align with the circumferential centers of the circumferential spaces between the outer walls 136. The inner walls 138 of the fitment 102 may extend axially to an extent such that they are circumferentially between the barrels 148*a,b,c* of the manifold 104 so as to maintain location and position of the manifold 104.

Figure 31:
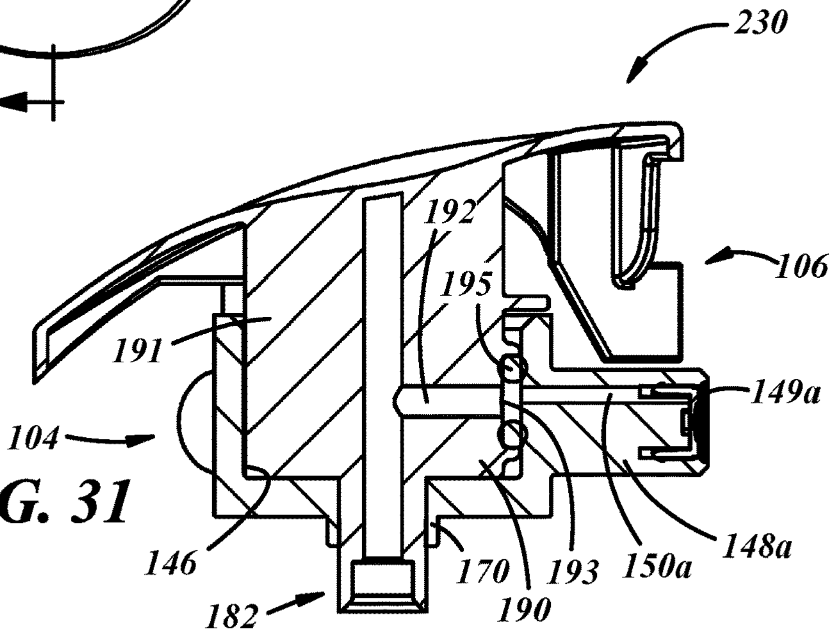
FIG. 31 illustrates an elevational cross sectional view of the distributor and manifold subassembly of FIG. 27, taken along line 31-31 of FIG. 30.
Figure 32:
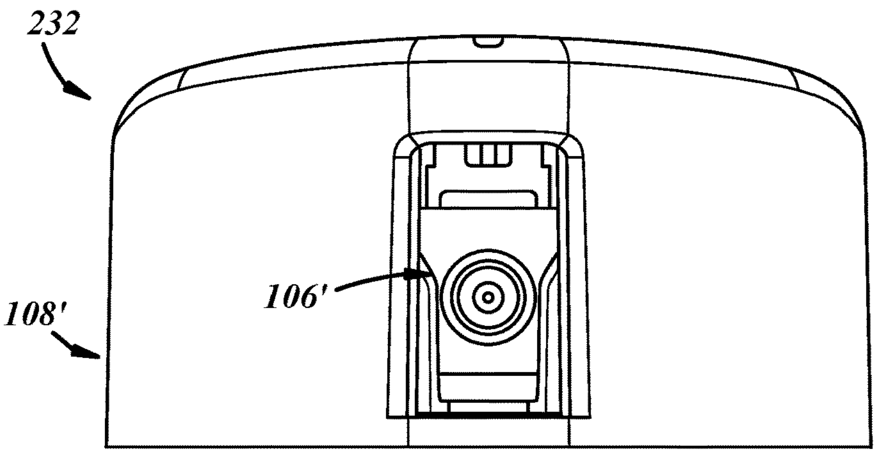
FIG. 32 illustrates an enlarged front elevational view of a subassembly including an overcap carrying a distributor according to another embodiment.
Figure 33:
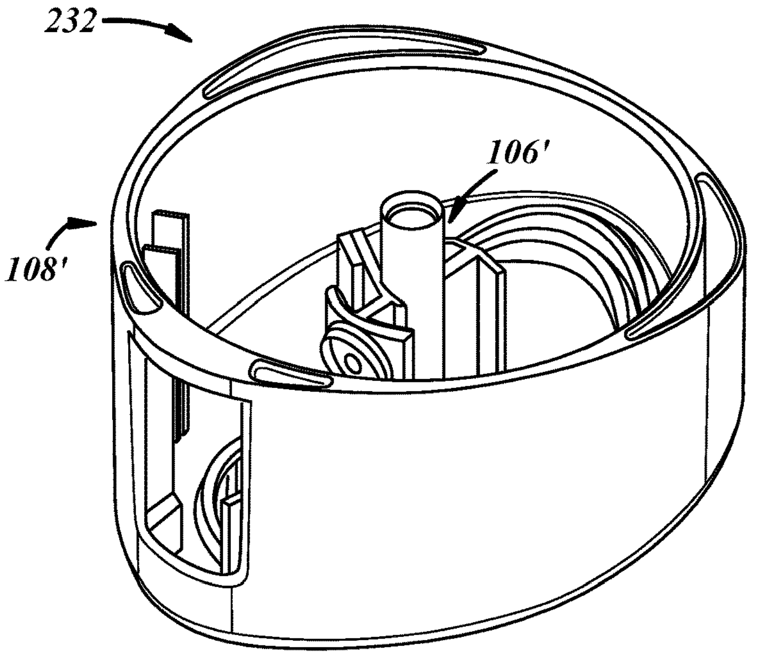
FIG. 33 illustrates an upside-down perspective view of the subassembly of FIG. 32.
Figure 34:
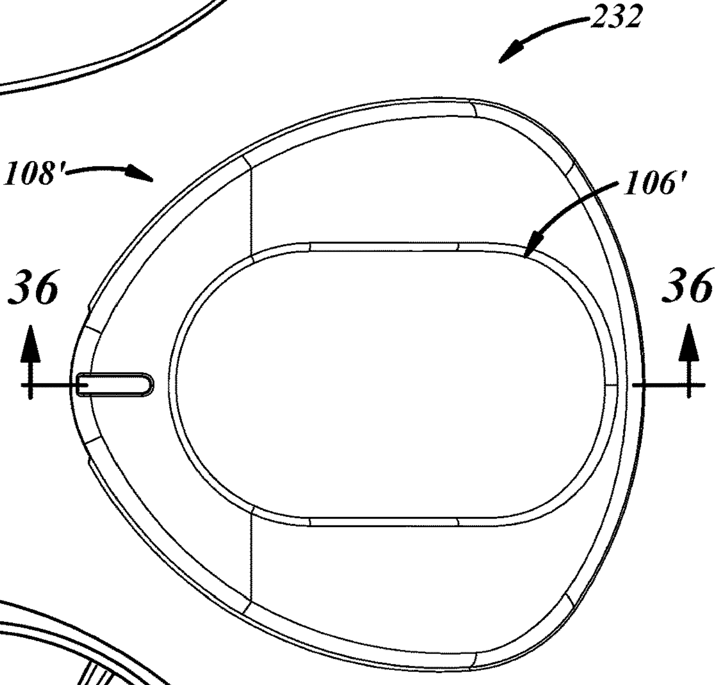
FIG. 34 illustrates a top view of the subassembly of FIG. 32.
Figure 35:
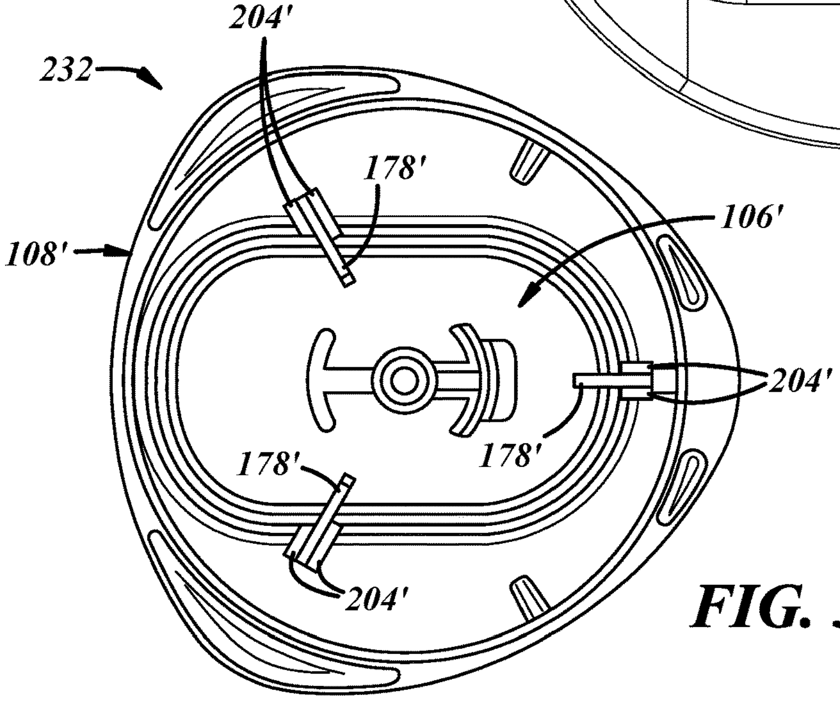
FIG. 35 illustrates a bottom view of the subassembly of FIG. 32.
Figure 36:
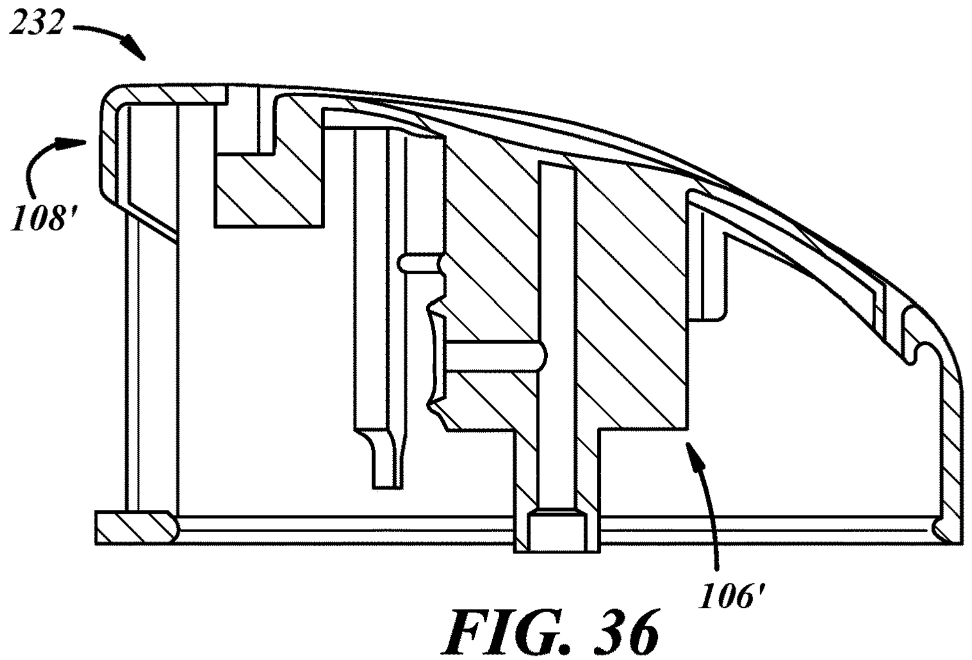
FIG. 36 illustrates a cross-sectional view of the subassembly of FIG. 32, taken along line 36-36 of FIG. 34.
Figure 37:
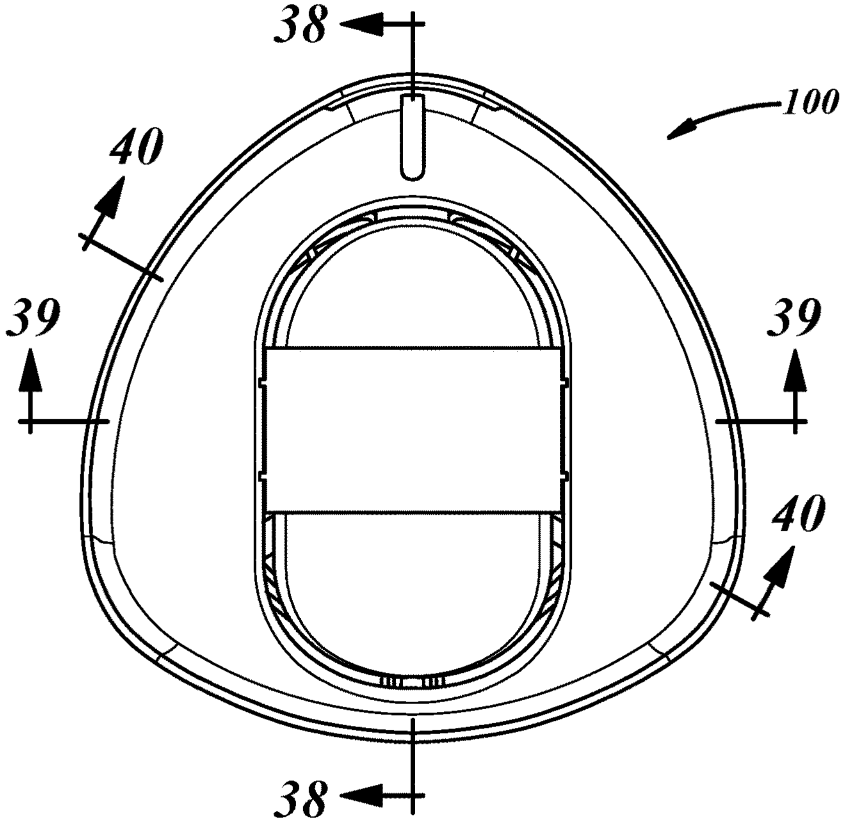
FIG. 37 illustrates an enlarged top view of the discharge modifier of FIG. 2, in the on or unlocked mode.

With reference now to FIGS. 27-31, in an illustrated embodiment of another discharge modifier sub-assembly 230, including the manifold 104 and the distributor 106, the axial conduit 182 of the distributor 106 is axially and rotatably carried in the axial passage 146 of the manifold 104 and extends through the hub 170 and below the manifold 104. The distributor 106 is configured for selective fluid communication with one of the spray passages 150*a* of the manifold 104 at a time depending on rotational position of the distributor 106 with respect to the manifold 104. As best shown in FIG. 31, the outlet 193 of the transverse passage 192 of the distributor 106 is shown substantially circumferentially aligned with the corresponding spray passage 150*a* of one of the spray barrels 148*a* with a seal 195 therebetween for sealing the transverse passage outlet to the corresponding inlets of the spray barrels 148*a,b,c*. The spray barrels 148*a,b,c* may carry nozzle fitments 149*a,b,c*.

With reference now to FIGS. 32-36, in an illustrated embodiment of an additional discharge modifier sub-assembly 232, another embodiment of a distributor 106' is shown carried by another embodiment of an overcap 108'. Overcap guide features 178' in the form of guide wings of the distributor 106' are guided between corresponding distributor guide features 204' in the form of flange pairs of the overcap 108' when the distributor 106' is depressed against the pressurized vessel V (FIG. 1). In contrast to the previously disclosed distributor 106 and overcap 108, here, the distributor 106' and overcap 108' have only three, instead of four, sets of corresponding guide features 178', 204' circumferentially angularly spaced 120 degrees from one another.

Figure 38:
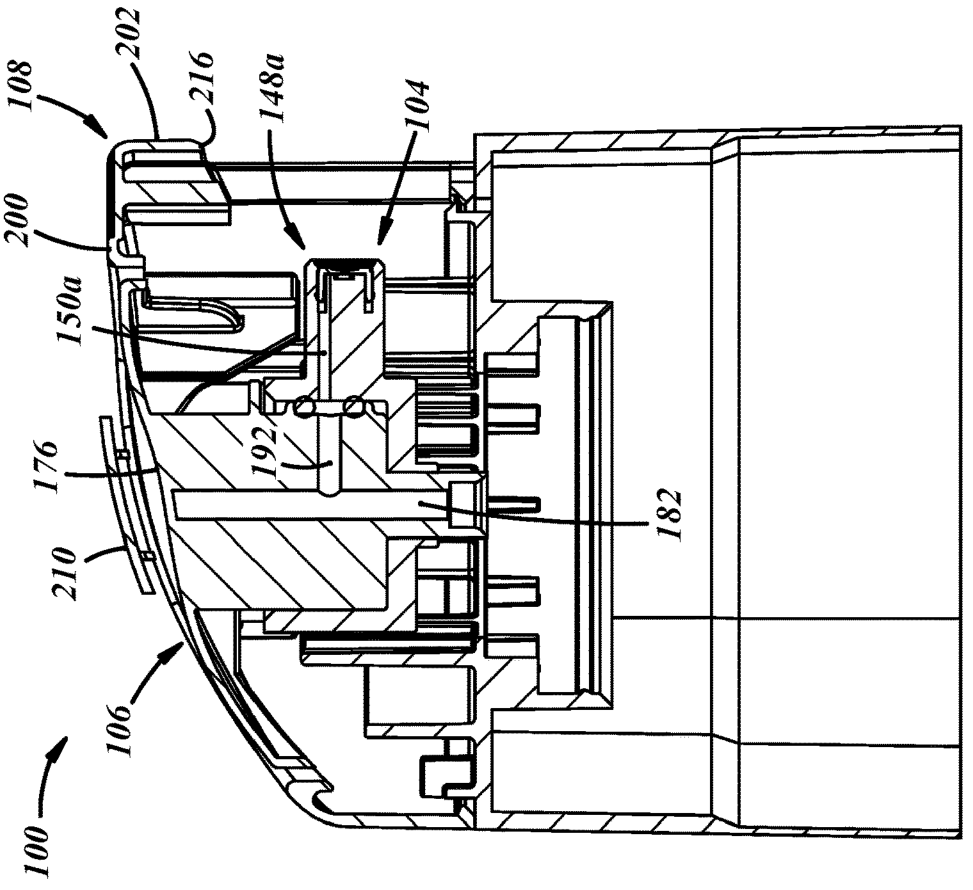
FIG. 38 illustrates a further enlarged cross-sectional view of the discharger modifier of FIG. 2, taken along line 38-38 of FIG. 37
Figure 41:
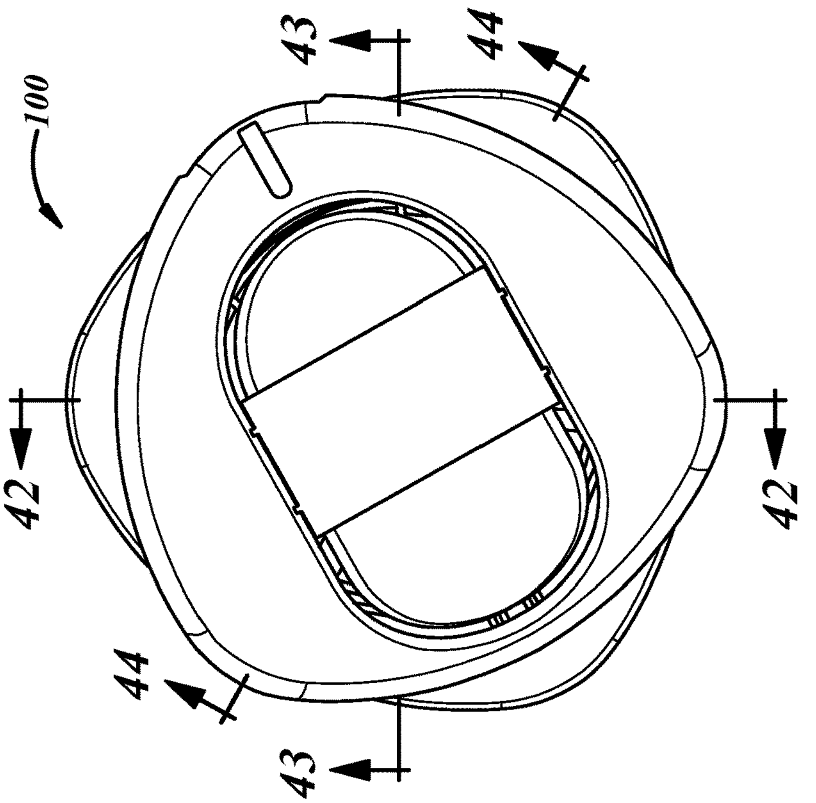
FIG. 41 illustrates an enlarged top view of the discharge modifier of FIG. 2, in the off or locked mode.

With reference now to FIGS. 37-40, the discharge modifier 100 is shown in an unlocked mode. As shown in FIG. 38, the transverse passage 192 of the distributor 106 is substantially circumferentially aligned with a corresponding spray passage 150*a* of the manifold 104, and the spray barrel 148*a* of the manifold 104 is substantially circumferentially aligned with the aperture 216 of the skirt 202 of the overcap 108 in the unlocked mode of the discharge modifier 100.

Figure 43:
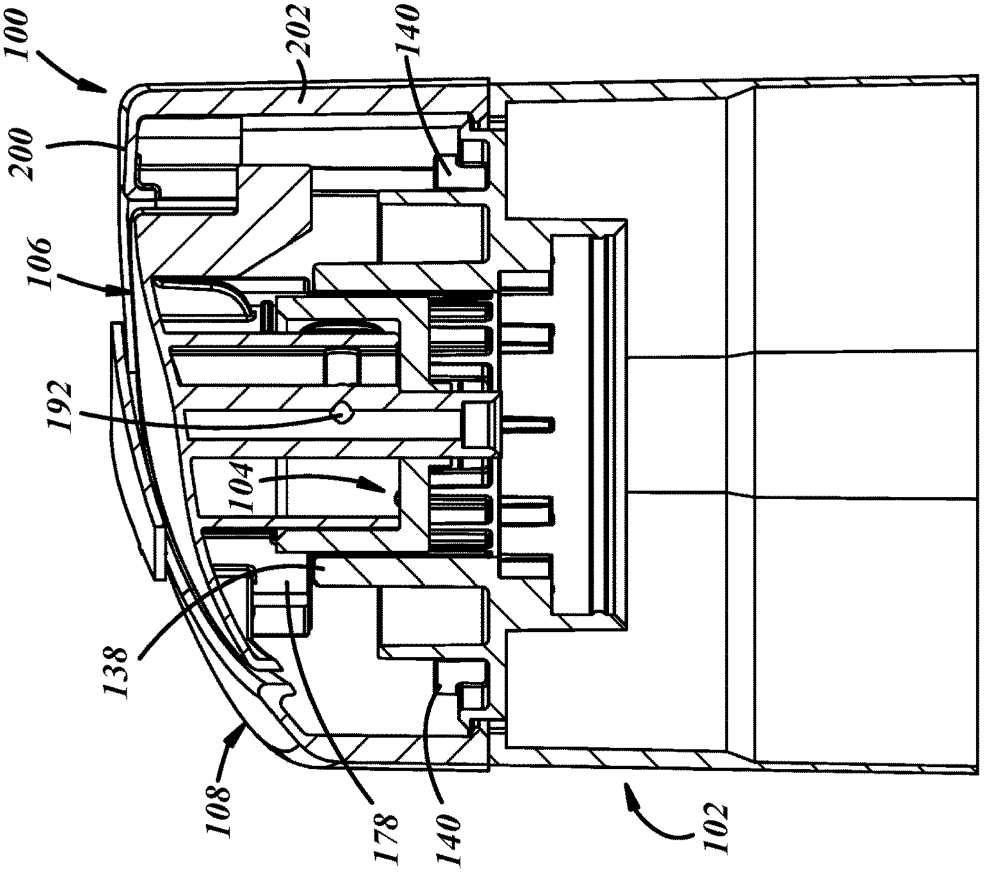
FIG. 43 illustrates a further enlarged cross-sectional view of the discharger modifier of FIG. 2, taken along line 43-43 of FIG. 41.
Figure 42:
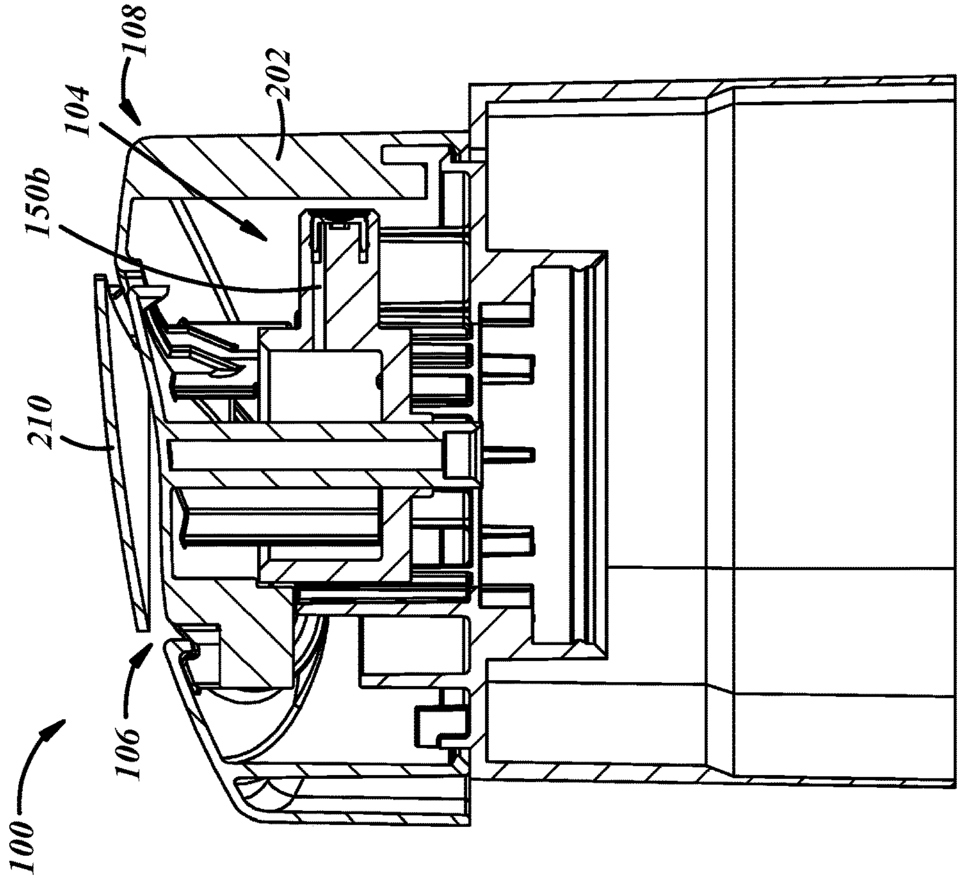
FIG. 42 illustrates a further enlarged cross-sectional view of the discharger modifier of FIG. 2, taken along line 42-42 of FIG. 41

With reference now to FIG. 41-44, the discharge modifier 100 is shown in a locked mode. As shown in FIGS. 42 and 43, the transverse passage 192 of the distributor 106 is out of circumferential alignment with respect to the spray passage 150*b* of the manifold 104, and the spray barrel 148*b* of the manifold 104 is out of circumferential alignment with respect to the aperture (not shown) of the skirt 202 of the overcap 108 in the locked mode of the discharge modifier 100.

Figure 39:
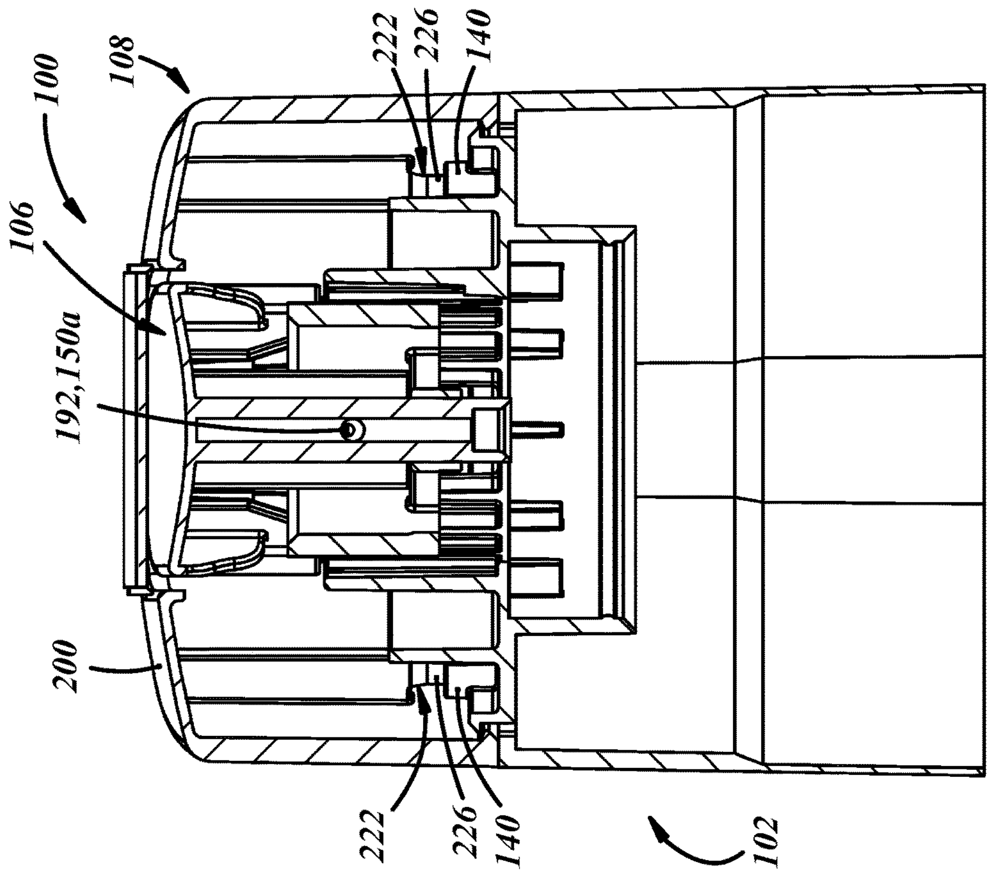
FIG. 39 illustrates a further enlarged cross-sectional view of the discharger modifier of FIG. 2, taken along line 39-39 of FIG. 37.

FIG. 39 illustrates a sectional view looking radially outwardly through the transverse passage 192 of the distributor 106 as it is substantially circumferentially aligned with the spray passage 150*a* of the manifold 104 (FIG. 38) in the unlocked mode of the discharge modifier 100. FIG. 39 also illustrates the flexible detent features 226 of the overcap 108 circumferentially adjacent to the corresponding detent features 140 of the fitment 102.

FIG. 43, conversely, illustrates an oblique sectional view of the transverse passage 192 of the distributor 106 when it is out of circumferentially alignment with respect to the spray passage (150*a*, FIG. 42) of the manifold 104 in the locked mode of the discharge modifier 100. FIG. 43 also shows the detent features 140 of the fitment 102 without the corresponding detent features (not shown) of the overcap 108, and also shows the guide features 178 of the distributor 106 axially adjacent to a free end of the inner walls 138 of the fitment 102 to prevent the distributor 106 from being depressed.

Figure 40:
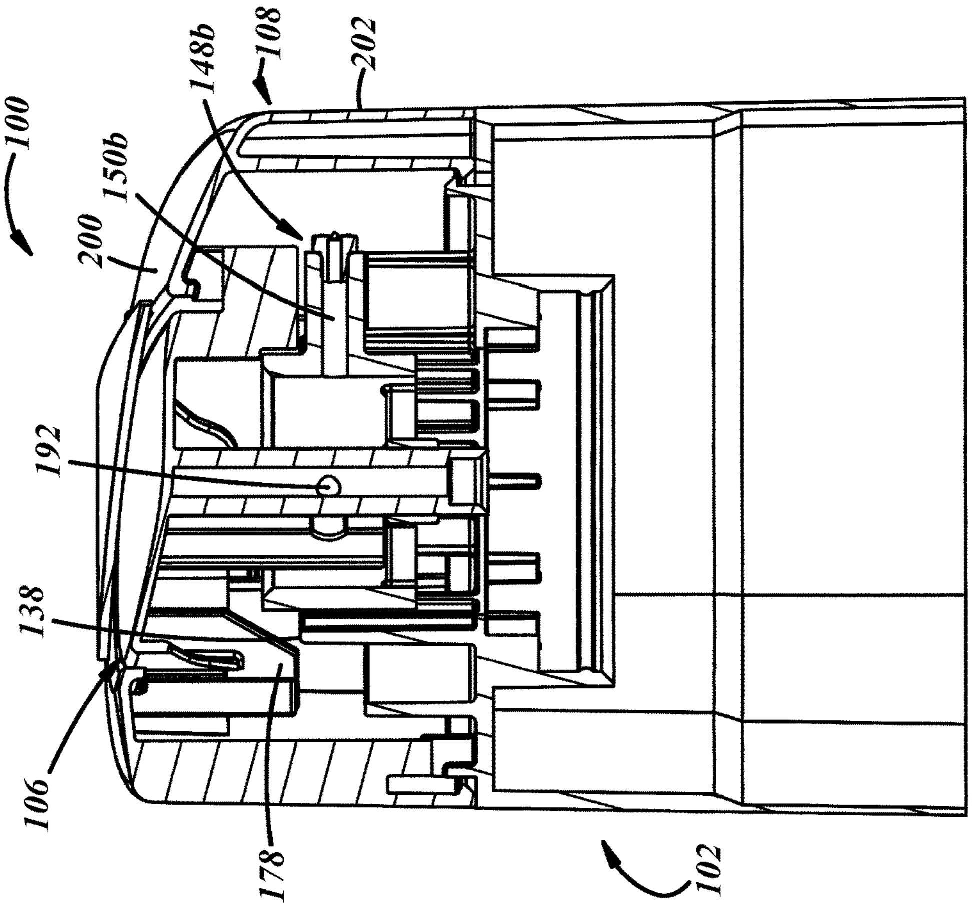
FIG. 40 illustrates a further enlarged cross-sectional view of the discharger modifier of FIG. 2, taken along line 40-40 of FIG. 37.
Figure 44:
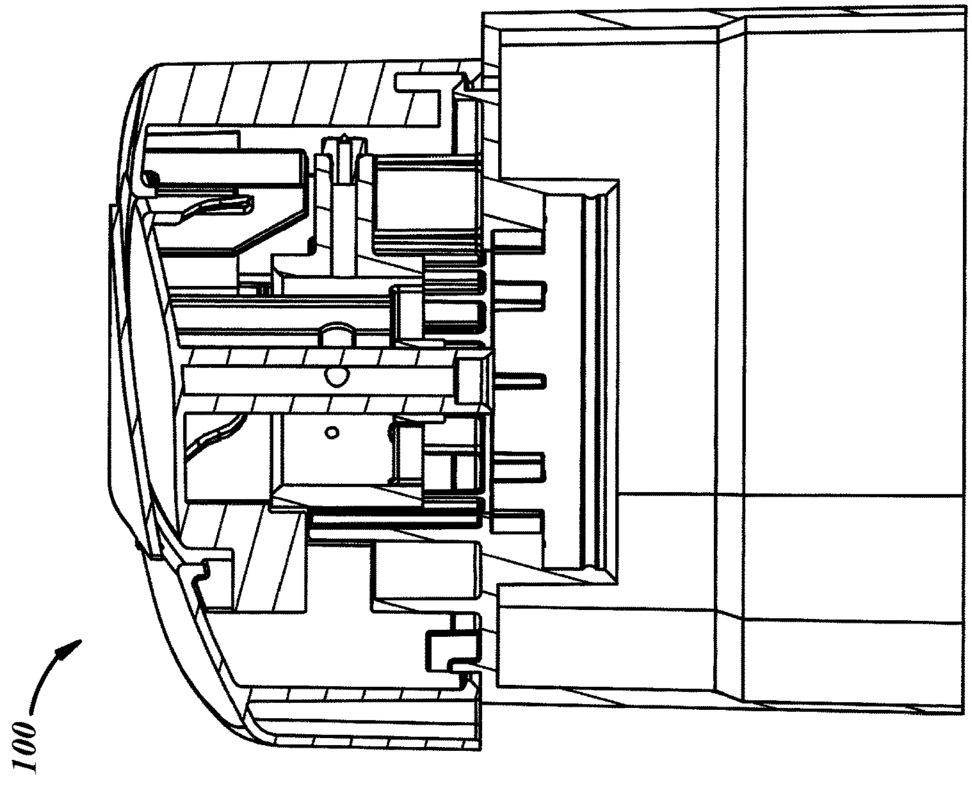
FIG. 44 illustrates a further enlarged cross-sectional view of the discharger modifier of FIG. 2, taken along line 44-44 of FIG. 41.
Figure 47:
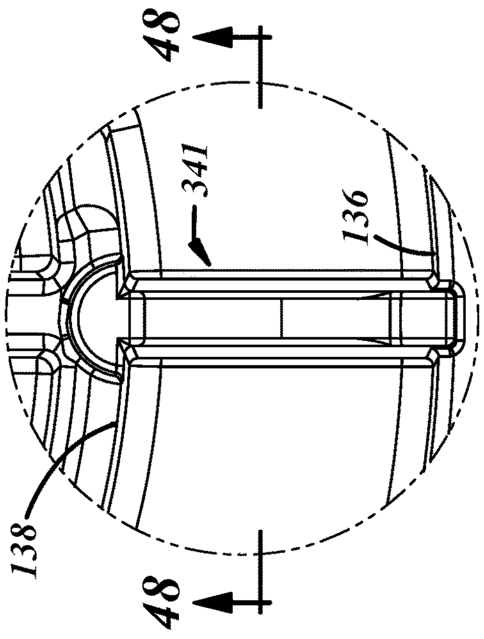
FIG. 47 illustrates an enlarged view of a detent feature taken from circle 47 of FIG. 45.
Figure 48:
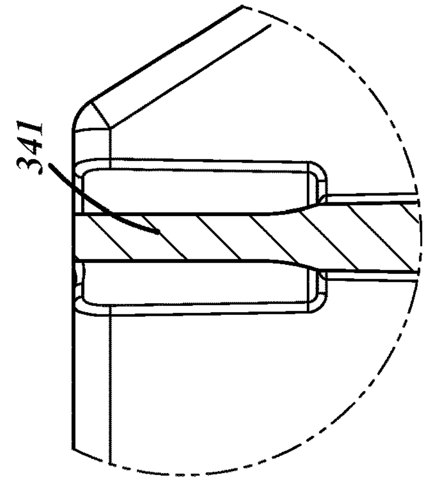
FIG. 48 illustrates a cross-sectional view of the detent feature of FIG. 47, taken along line 48 of FIG. 47.

Likewise, FIG. 44 also shows the guide features 178 of the distributor 106 axially adjacent to free ends of the inner walls 138 of the fitment 102 to prevent the distributor 106 from being depressed. In contrast, FIG. 40 shows the guide features 178 free and clear of the inner walls 138 of the fitment 102, in circumferential spaces (not shown) therebetween.

In assembly, the discharge modifier 100 may be subassembled before being applied to a pressurized vessel V (FIG. 1). For example, with reference to FIG. 35, the distributor 106' may be assembled to the overcap 108' by circumferentially aligning the overcap guide features 178' of the distributor 106' between the corresponding distributor guide features 204' of the overcap 108' and sliding the two parts together. Then, with reference to FIG. 31, the axial conduit 182 and curvate T-shaped wing portions 190, 191 of the distributor 106 may be inserted into and bottomed out within the axial passage 146 of the manifold 104. Subsequently, with reference to FIG. 26, the manifold 104 may be assembled to the fitment 102 such that the barrels 148*a,b,c* fit circumferentially between the inner walls 138 of the fitment 102. Thereafter, with reference to FIG. 38, the fitment 102 may be snap fit to the overcap 108 to complete the sub-assembly. Finally, the sub-assembled discharge modifier 100 may be assembled to the pressurized vessel V (FIG. 1) by locating the fitment 102 against an upper end of the pressurized vessel V while locating the valve stem S of the pressurized vessel V into the inlet 188 (FIG. 19) of the distributor 106, and snap fitting the fitment 102 to the pressurized vessel V (FIG. 1).

In use, with reference to FIG. 38, a user grasps the pressurized vessel V (FIG. 1) with the user's hand and depresses the finger pad 200 of the distributor 106 with one or more fingers of the user's hand to discharge fluid under pressure out of the pressurized vessel V (FIG. 1), out of the valve stem S (FIG. 1), into the axial passage 182 of the distributor 106, into and through the transverse passage 192 of the distributor 106, through and out of one of the plurality of barrel passages 150*a,b,c* and through the outlet/aperture 216 of the overcap 108, out of the discharge modifier 100. To selectively arrange the discharge modifier 100 from a first arrangement to a second arrangement, the discharge modifier 100 need not be disassembled or removed from the pressurized vessel V. Rather, the user may grasp the pressurized vessel V with one hand, and use one or more fingers from the user's other hand to rotate the overcap 108 to circumferentially align the overcap aperture 216 with another one of the plurality of barrel passages 150*a,b,c* and register the fitment detent features 222 of the overcap 108 in circumferentially alignment and detent engagement with the overcap detent features 140 of the fitment 102. When rotated, the distributor guide features 220 (FIG. 23) of the overcap 108 engage the corresponding overcap guide features 178 (FIG. 16) of the distributor 106 to rotate the distributor 106 with respect to the fitment 102. Accordingly, the distributor 106 is depressible for spray actuation and rotatable for selectively arranging spray characteristics. Of course, the overcap 108 and/or the fitment 102 may include any suitable indicia to help the user orient the discharge modifier 100 and/or any suitable ergonomic features like finger indents, knurling, or the like to facilitate rotating of the distributor 100.

In general, the components of the discharge modifier 100 can be manufactured according to any suitable techniques to those skilled in the art, including molding, machining, stamping, additive manufacturing, and/or the like. Also, the discharge modifier 100 can be assembled according to automated, manual, and/or any other suitable techniques. Likewise, any suitable materials can be used in making the components, such as metals, composites, polymeric materials, and/or the like.

With reference now to FIGS. 45-56, additional embodiments of various components of a discharge modifier will be disclosed. These embodiments are similar in many respects to the embodiment of FIGS. 2-44 and like numerals between the embodiments generally designate like or corresponding elements throughout the several views of the drawing figures. Accordingly, the descriptions of the embodiments are hereby incorporated into one another, and description of subject matter common to the embodiments generally may not be repeated.

Figure 45:
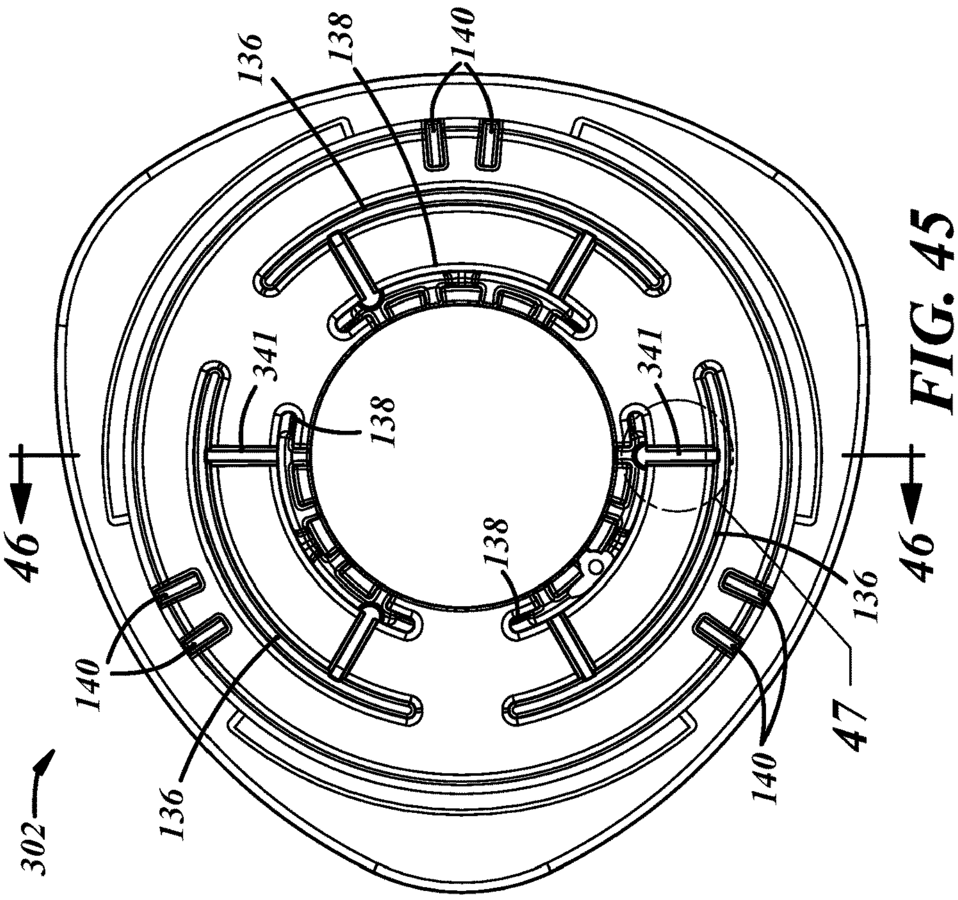
FIG. 45 illustrates a top view according to another illustrative embodiment of a fitment having additional overcap detent features.
Figure 46:
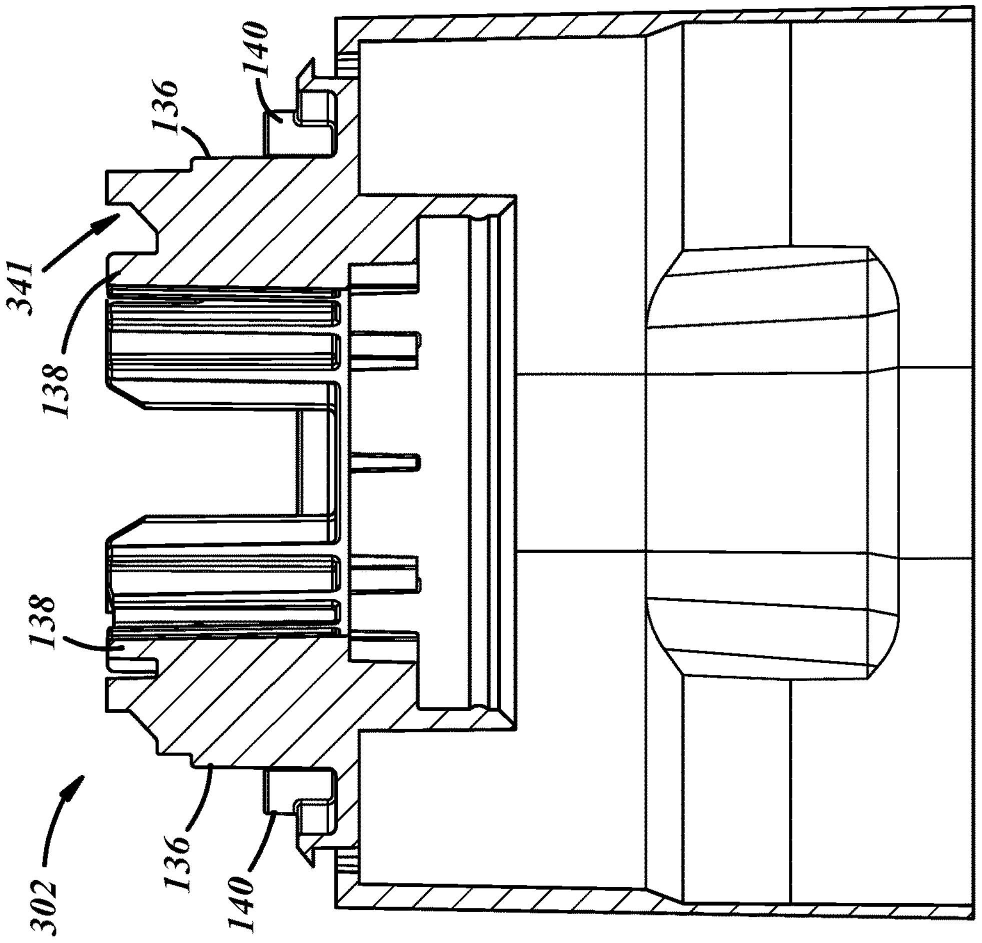
FIG. 46 illustrates an elevational cross-sectional view of the fitment of FIG. 45, taken along line 46 of FIG. 45.

FIGS. 45 and 46 illustrate views of a fitment 302 having the previously disclosed overcap detent features 140 but also having alternative overcap detent features 341. The alternative overcap detent features 341 extend radially between the outer and inner walls 136, 138, and may be provided in diametrically opposite pairs, for example, three pairs, corresponding to three spray barrels of a manifold (not shown here), and three spray "on" positions of a discharger modifier. As better shown in FIGS. 47 and 48, the detent features 341 may include click ribs or flexible free ends of longer and more rigid rib portions.

Figure 49:
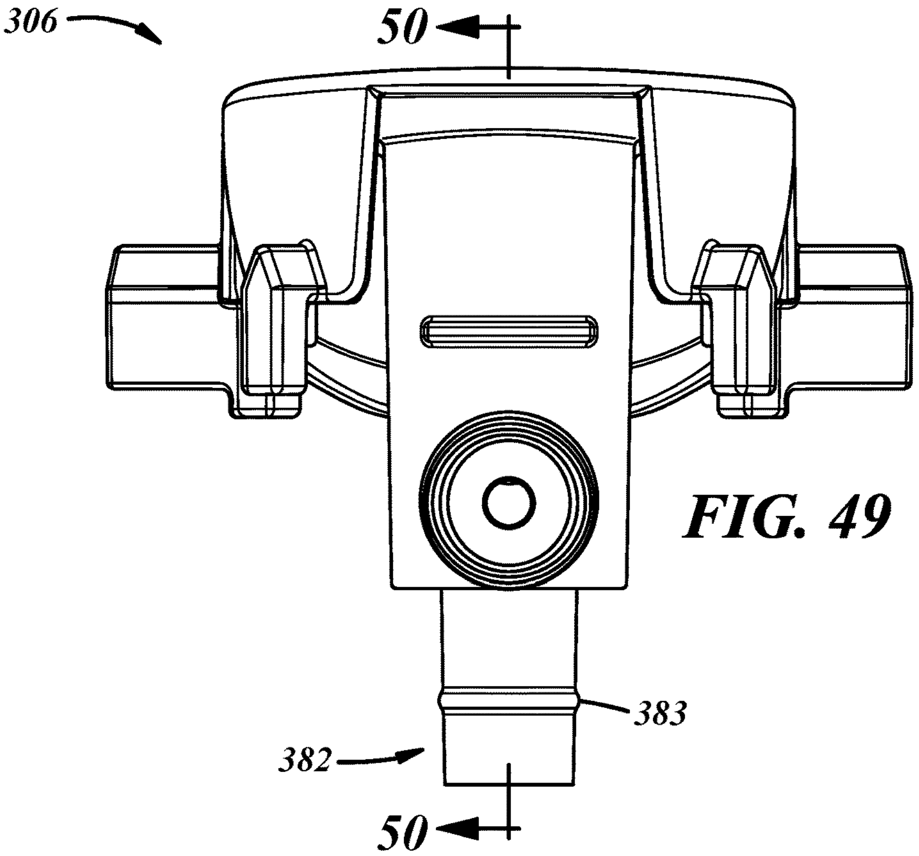
FIG. 49 illustrates a front view according to another illustrative embodiment of a distributor.
Figure 50:
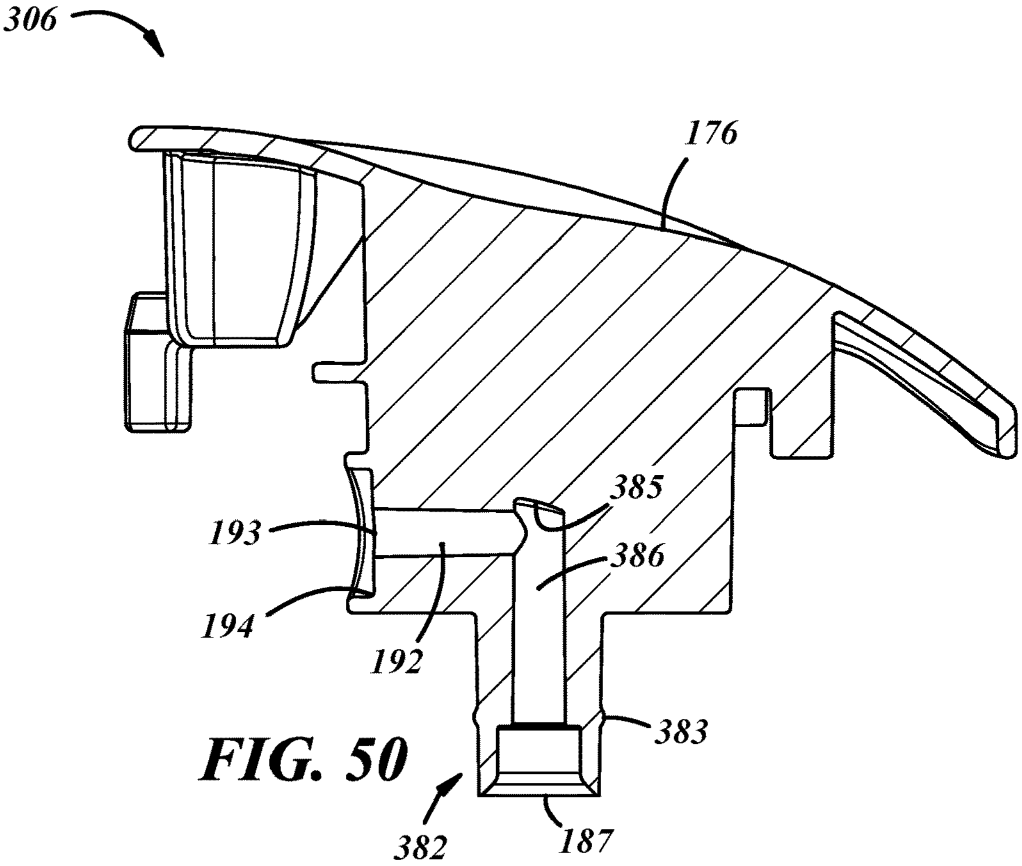
FIG. 50 illustrates an elevational cross-sectional view of the distributor of FIG. 49, taken along line 50 of FIG. 49.

FIGS. 49 and 50 illustrate views of a distributor 306 having an axial conduit 382 with a radially outwardly projecting circumferential rib 383. The rib 383 may facilitate good sealing with, and/or retention of, a manifold (not shown) to which the distributor 306 may be subassembled. With reference to FIG. 50, the distributor 306 has the inlet 187, and the transverse passage 192 with the outlet 193 and pocket 194, but here has a relatively short axial passage 386 that terminates at an upper end 385 at an inlet of the transverse passage 192 instead of terminating at the finger pad 176 as with the previous embodiment. Also, the upper end 385 may be oriented at an angle extending upwardly toward the inlet of the transverse passage 192.

Figure 51:
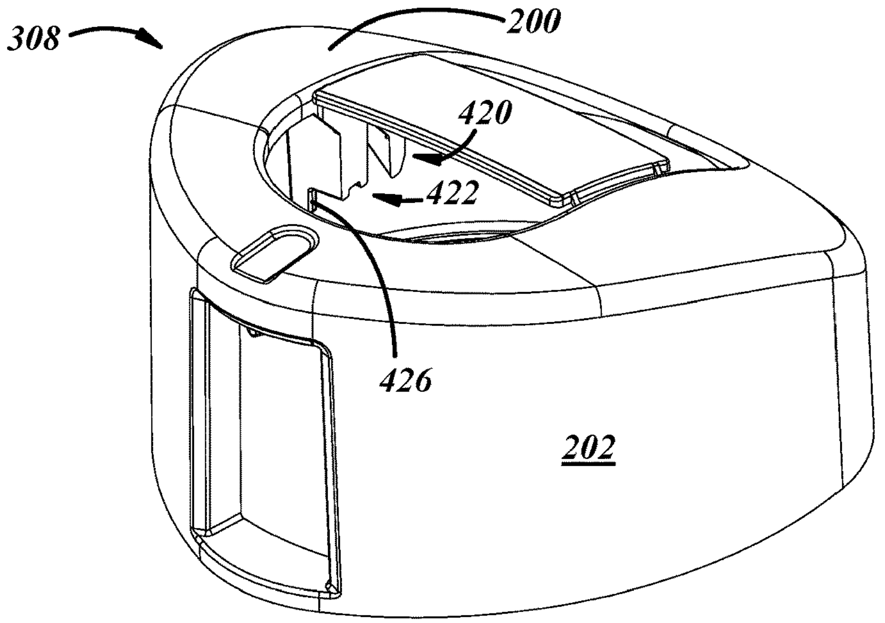
FIG. 51 illustrates a perspective view according to another illustrative embodiment of an overcap.
Figure 52:
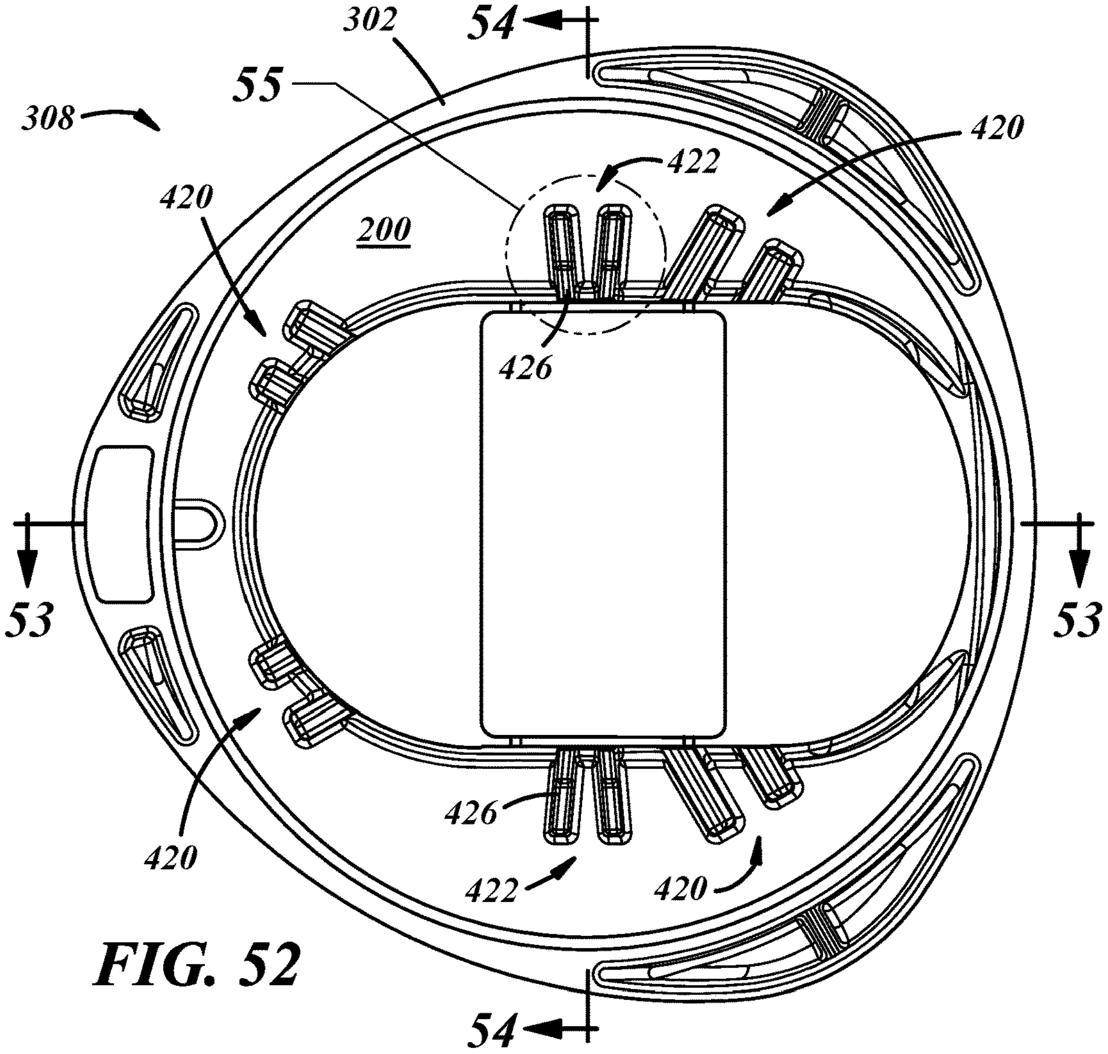
FIG. 52 is an enlarged bottom view of the overcap of FIG. 51.
Figure 53:
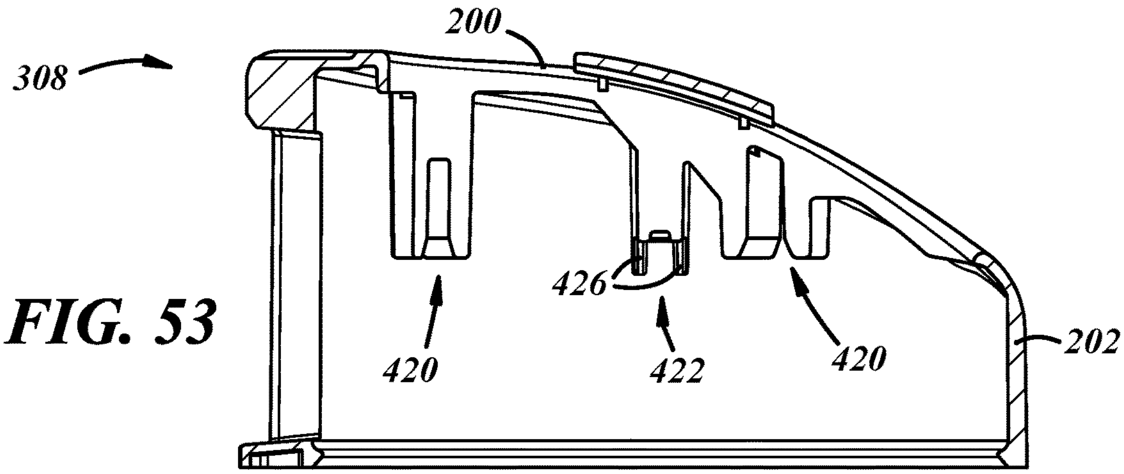
FIG. 53 is a cross-sectional elevational view of the overcap of FIG. 51, taken along line 53 of FIG. 52.
Figure 54:
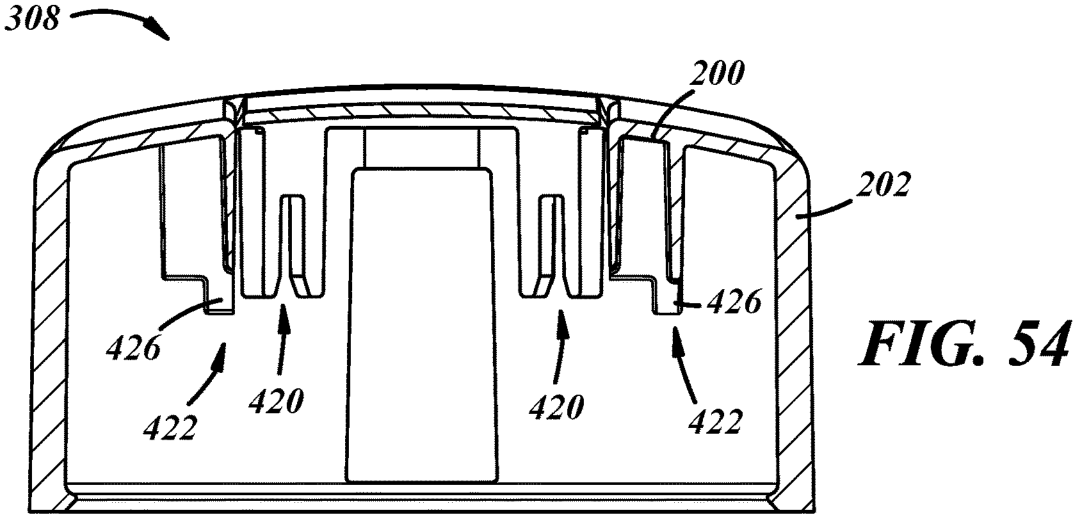
FIG. 54 is another cross-sectional elevational view of the overcap of FIG. 51, taken along line 54 of FIG. 52.
Figure 55:
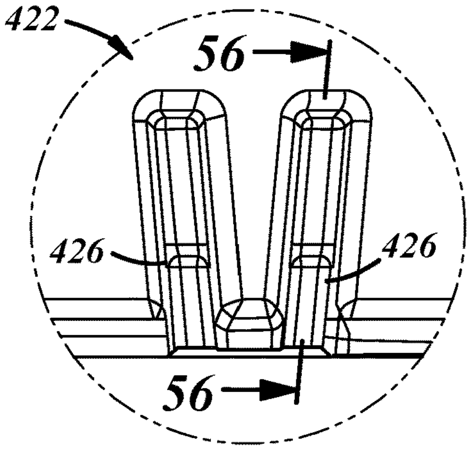
FIG. 55 is an enlarged bottom view of detent features of the overcap of FIG. 51, taken from circle 55 of FIG. 52.
Figure 56:
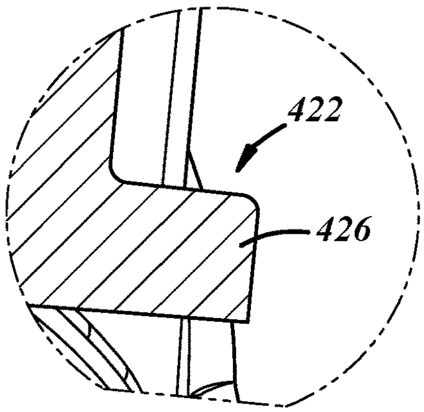
FIG. 56 is a further enlarged cross-sectional view of one of the detent features shown in FIG. 55, taken along line 56 of FIG. 55.

FIGS. 51 and 52 illustrate views of an overcap 308 having the base wall 200, and the skirt 202 depending away from the base wall 200, but also having alternative distributor guide features 420 and alternative fitment detent features 422. With reference to FIGS. 52-54, the fitment detent features 422 may extend axially away from fixed ends at an inside surface of the base wall 200 and may be spaced radially inwardly from an inside surface of the skirt 202. The detent features 422 include free ends in the form of click ribs 426. As best shown in FIGS. 55 and 56, the detent features 422 may be L-shaped with each click rib 426 forming the shorter legs of the "L". Of course, the click ribs 426 are configured to engage between the corresponding alternative overcap detent features 341 of the fitment 302 (FIGS. 45-48).

As used in this patent application, the terminology "for example," "for instance," "like," "such as," "comprising," "having," "including," and the like, when used with a listing of one or more elements, is open-ended, meaning that the listing does not exclude additional elements. Likewise, when preceding an element, the articles "a," "an," "the," and "said" mean that there are one or more of the elements. Moreover, directional words such as front, rear, top, bottom, upper, lower, radial, circumferential, axial, lateral, longitudinal, vertical, horizontal, transverse, and/or the like are employed by way of example and not limitation. As used herein, the term "may" is an expedient merely to indicate optionality, for instance, of an element, feature, or other thing, and cannot be reasonably construed as rendering indefinite any disclosure herein. Other terms are to be interpreted and construed in the broadest reasonable manner in accordance with their ordinary and customary meaning in the art, unless the terms are used in a context that requires a different interpretation.

Finally, the present disclosure is not a definitive presentation of an invention claimed in this patent application, but is merely a presentation of examples of illustrative embodiments of the claimed invention. More specifically, the present disclosure sets forth one or more examples that are not limitations on the scope of the claimed invention or on terminology used in the accompanying claims, except where terminology is expressly defined herein. And although the present disclosure sets forth a limited number of examples, many other examples may exist now or are yet to be discovered and, thus, it is neither intended nor possible to disclose all possible manifestations of the claimed invention. In fact, various equivalents will become apparent to artisans of ordinary skill in view of the present disclosure and will fall within the spirit and broad scope of the accompanying claims. Features of various implementing embodiments may be combined to form further embodiments of the invention. Therefore, the claimed invention is not limited to the particular examples of illustrative embodiments disclosed herein but, instead, is defined by the accompanying claims.

The invention claimed is:

1. A pressure vessel discharge modifier, comprising:
a fitment, including:
a base wall having a base aperture,
a radially outer skirt extending axially away from the base wall in an inward direction,
a radially inner skirt extending axially away from the base wall in the inward direction, and
a plurality of circumferentially extending inner walls extending axially away from the base wall in an outward direction;
a manifold supported by the fitment, and including:
a cylinder, including an axially lower end, an axially upper end, a radially outer surface, an inlet at the axially lower end, and an axial passage extending between the lower and upper ends, and
a plurality of spray barrels extending radially outwardly with respect to the cylinder, and including a plurality of barrel passages in fluid communication with the axial passage of the cylinder;
a distributor rotatably carried by the manifold, and including:
an axial conduit including an inlet and an outlet and in fluid communication with the inlet via an axial passage extending therebetween, and
a center support rotatably carried in the axial passage of the cylinder of the manifold and including a transverse passage in fluid communication with the axial passage and having an outlet; and
an overcap rotatably coupled to the fitment, and including:
a base wall,
a circumferentially extending skirt extending away from the base wall, and
an outlet in the circumferentially extending skirt to substantially circumferentially align with one of the spray barrels in a spray mode of the discharge modifier.

2. The discharge modifier of claim 1, wherein the distributor further includes a plurality of guide features axially slidably coupled to corresponding guide features of the overcap.

3. The discharge modifier of claim 1, wherein the distributor further includes a finger pad carried in a corresponding aperture in the base wall of the overcap.

4. The discharge modifier of claim 3, wherein the axial conduit extends away from the finger pad and past the axially lower end of the cylinder of the manifold.

5. The discharge modifier of claim 4, wherein the center support includes curved T-shaped wings.

6. The discharge modifier of claim 1, wherein the spray barrels of the manifold have fixed ends at the cylinder and are cantilevered to terminate in free ends carrying nozzle fitments.

7. The discharge modifier of claim 6, wherein the spray barrels are three in quantity and are circumferentially equidistantly spaced from one another.

8. A pressurized sprayer, comprising:
a pressurized vessel; and
the discharge modifier of claim 1, wherein the radially inner skirt of the fitment is fastened to the pressurized vessel, and wherein the discharge modifier is selectively arrangeable without disassembly of the discharge modifier and without removal of the discharge modifier from the pressurized vessel.

9. The pressurized sprayer of claim 8, wherein the discharge modifier is selectively arrangeable by rotating the overcap.

10. The pressurized sprayer of claim 8, wherein the fitment includes a radially outer skirt that is not fastened to the pressurized vessel.

11. A discharge modifier fitment comprising:

a base wall having a base aperture;

a radially inner skirt extending axially away from the base wall in an axially inward direction;

a radially outer skirt extending axially away from the base wall in the axially inward direction and being axially longer than the radially inner skirt; and a plurality of circumferentially extending inner walls extending axially away from the base wall in an outward direction and having a plurality of circumferential spaces therebetween.

12. The discharge modifier fitment of claim 11, further comprising:

a plurality of circumferentially extending outer walls extending axially away from the base wall in an outward direction and having a plurality of circumferential spaces therebetween; and a plurality of overcap detent features radially outward of the outer walls and extending axially away from the base wall in the outward direction.

13. The discharge modifier fitment of claim 11, further comprising:

a plurality of circumferentially extending outer walls extending axially away from the base wall in an outward direction and having a plurality of circumferential spaces therebetween; and a plurality of overcap detent features extending radially between the inner and outer walls.

14. The discharge modifier fitment of claim 11, further comprising:

an overcap snap feature extending axially away from the base wall in the outward direction.

15. A discharge modifier manifold, comprising:

a cylinder, including:

an axially lower end, an axially upper end, a radially outer surface, an inlet at the axially lower end, and an axial passage extending between the lower and upper ends;

a plurality of spray barrels extending radially outwardly with respect to the cylinder, and including a plurality of barrel passages in fluid communication with the axial passage of the cylinder; and a hub at a radially inward end of a base wall, protruding axially beyond a lower surface of the base wall, and in fluid communication with the axial passage of the cylinder.

16. The discharge modifier manifold of claim 15, further comprising:

a plurality of nozzle fitments carried by the plurality of spray barrels.

17. A discharge modifier distributor comprising:

an actuator portion including a base wall finger pad of a base wall; and a distributor portion extending away from the actuator portion and including an axial conduit extending axially away from an inward surface of the base wall, carrying an axial passage and terminating in an inlet, and a center support extending radially away from the axial conduit, including excurvate T-shaped wings extending radially outwardly from the axial conduit, and carrying a transverse passage in fluid communication with the axial passage of the axial conduit.

18. The discharge modifier distributor of claim 17, wherein the axial conduit has a radially outwardly and circumferentially extending rib.

19. A discharge modifier overcap comprising:

a base wall including an actuator aperture;

a use-evident bridge spanning the actuator aperture and frangibly connected to the base wall on either side of the actuator aperture;

a circumferentially extending skirt extending away from the base wall, and including an outlet; and at least one detent feature extending axially from and terminating in a flexible detent features.

20. The discharge modifier overcap of claim 19, further comprising:

a plurality of circumferentially spaced guide features extending axially.

21. The discharge modifier overcap of claim 19, wherein the at least one detent feature extends axially along an inside surface of the circumferentially extending skirt.

22. The discharge modifier overcap of claim 19, wherein the flexible detent feature is spaced radially inwardly from the circumferentially extending skirt.

23. A discharge modifier, comprising at least one of the following discharge modifier sub-assemblies:

a first discharge modifier sub-assembly comprising a discharge modifier overcap comprising a base wall, a circumferentially extending skirt extending away from the base wall, and including an outlet, and at least one detent feature extending axially and terminating in a flexible detent features, and a discharge modifier distributor comprising an actuator portion including a base wall finger pad of a base wall, and a distributor portion extending away from the actuator portion and including an axial conduit extending axially away from an inward surface of the base wall, carrying an axial passage, and terminating in an inlet, and a center support extending radially away from the axial conduit and carrying a transverse passage in fluid communication with the axial passage of the axial conduit;

or a second discharger modifier sub-assembly comprising a discharge modifier manifold comprising a cylinder, including an axially lower end, an axially upper end, a radially outer surface, an inlet at the axially lower end, and an axial passage extending between the lower and upper ends, and a plurality of spray barrels extending radially outwardly with respect to the cylinder, and including a plurality of barrel passages in fluid communication with the axial passage of the cylinder, and a discharge modifier fitment comprising
a base wall having a base aperture,
a radially inner skirt extending axially away from the base wall in an axially inward direction,
a radially outer skirt extending axially away from the base wall in the axially inward direction and being axially longer than the radially inner skirt, and
a plurality of circumferentially extending inner walls extending axially away from the base wall in an outward direction and having a plurality of circumferential spaces therebetween.

24. A discharge modifier manifold, comprising:
a cylinder, including:
an axially lower end,
an axially upper end,
a radially outer surface,
an inlet at the axially lower end, and
an axial passage extending between the lower and upper ends;
a plurality of spray barrels extending radially outwardly with respect to the cylinder, and including a plurality of barrel passages in fluid communication with the axial passage of the cylinder;
a base wall including a plurality of spokes extending radially inwardly from the axially lower end of the cylinder; and
a hub at a radially inward end of the base wall and in fluid communication with the axial passage of the cylinder.

25. A discharge modifier distributor comprising:
an actuator portion including
a base wall including a base wall finger pad,
a plurality of guide blades extending radially outwardly and axially inwardly with respect to the base wall, and
a skirt extending axially inwardly from the base wall; and
a distributor portion extending away from the actuator portion and including
an axial conduit extending axially away from an inward surface of the base wall, carrying an axial passage and terminating in an inlet, and
a center support extending radially away from the axial conduit and carrying a transverse passage in fluid communication with the axial passage of the axial conduit.

26. A discharge modifier overcap comprising:
a base wall;
a circumferentially extending skirt extending away from the base wall, and including an outlet and an inside surface; and
at least one detent feature extending axially along and in contact with the inside surface of the circumferentially extending skirt and terminating in a flexible detent flange or click rib spaced radially inwardly from the circumferentially extending skirt.

* * * * *